US012643243B1

(12) United States Patent　(10) Patent No.: US 12,643,243 B1
Shah　(45) Date of Patent:　Jun. 2, 2026

(54) AUTOWRAP ROBOTICS: AI PLATFORM FOR AUTOMATED VEHICLE SURFACE TREATMENT USING HUMANOID ROBOTS

(71) Applicant: Raoul Shah, West Palm Beach, FL (US)

(72) Inventor: Raoul Shah, West Palm Beach, FL (US)

(73) Assignee: AutoWrap Robotics LLC

( * ) Notice: Subject to any disclaimer, the term of this patent is extended or adjusted under 35 U.S.C. 154(b) by 0 days.

(21) Appl. No.: 19/260,568

(22) Filed: Jul. 6, 2025

(51) Int. Cl.
　*B25J 11/00*　(2006.01)
　*B25J 9/16*　(2006.01)
　*B25J 13/08*　(2006.01)
　*B25J 15/00*　(2006.01)
　*B25J 15/04*　(2006.01)
　*B60R 13/04*　(2006.01)
　*B60S 3/04*　(2006.01)

(52) U.S. Cl.
　CPC ........... *B25J 11/0075* (2013.01); *B25J 9/161* (2013.01); *B25J 9/1697* (2013.01); *B25J 15/0009* (2013.01); *B25J 15/0019* (2013.01); *B25J 15/0491* (2013.01); *B60R 13/04* (2013.01); *B60S 3/04* (2013.01); *B25J 13/082* (2013.01); *B25J 13/084* (2013.01)

(58) Field of Classification Search
　CPC .................................................... B60R 13/04
　See application file for complete search history.

(56) References Cited

U.S. PATENT DOCUMENTS

| | | | | |
|---|---|---|---|---|
| 10,282,914 B1* | 5/2019 | Tran | ..................... | A61B 5/1128 |
| 2009/0008955 A1 | 1/2009 | Seymour | | |
| 2016/0288328 A1* | 10/2016 | Bingham | ............... | G06Q 10/20 |
| 2018/0339456 A1* | 11/2018 | Czinger | ............... | B29C 64/379 |
| 2018/0345693 A1* | 12/2018 | Prinsen | ............. | H04N 1/00037 |

(Continued)

FOREIGN PATENT DOCUMENTS

| | | | | | |
|---|---|---|---|---|---|
| CN | 110861092 A | * | 3/2020 | ............. | B25J 9/163 |
| CN | 107343382 B | * | 8/2020 | ......... | B25J 11/0045 |
| CN | 117693720 A | * | 3/2024 | ......... | B25J 11/0065 |

*Primary Examiner* — Kamini S Shah
*Assistant Examiner* — Anzuman Sharmin

(57) ABSTRACT

AutoWrap Robotics is an AI-driven software platform enabling autonomous surface treatments—such as PPF, vinyl wraps, ceramic coatings, window tinting, and custom graphics—on vehicles, watercraft, and buildings. It integrates real-time 3D surface mapping, machine learning, and automated multi-tool switching to perform complex tasks with minimal human input. The system supports gantry robots, articulated arms, mobile platforms, and humanoid robots like Tesla Optimus and Figure AI, offering scalable, flexible control. Cloud-based intelligence powers fleet-wide optimization, allowing shared data to continuously improve motion paths, defect correction, and alignment. This ensures consistent quality and precision across high-volume applications, including branded fleets and commercial installations. By uniting AI-driven planning with robotic dexterity, AutoWrap Robotics delivers high-quality film and coating applications in both controlled and remote settings—without requiring custom hardware. This lowers deployment time, reduces operational costs, and positions the platform as a scalable solution for automated surface treatment at industrial scale.

10 Claims, 15 Drawing Sheets

(56)          References Cited

U.S. PATENT DOCUMENTS

| | | | |
|---|---|---|---|
| 2019/0002143 A1 | 1/2019 | Johansen | |
| 2021/0101183 A1* | 4/2021 | Sakai | B08B 1/165 |
| 2022/0380072 A1 | 12/2022 | Wagner | |
| 2024/0308024 A1* | 9/2024 | Lin | B24B 49/12 |

* cited by examiner

301 SCAN

302 GENERATE WRAP PLAN

303 APPLY FILM

304 QUALITY CONTROL

305 SAVE

107

201

601

106

105

Tool Head Auto-Switching Workflow

1000 — Start

1001 — Identify required tool (e.g., vinyl roller)

1002 — Check current tool mounted

1003 — Is tool correct?

1004 — → No: Move to Tool Magazine

1005 — Detach current tool

1006 — Attach correct tool

1007 — Return to work position

1008 — → Yes: Continue operation

1009 —

Humanoid Robot Task Assignment Logic

1100 — Start

1101 — Wake-up / Boot humanoid robot

1102 — Receive job ticket (vehicle ID, wrap type)

1103 — Analyze job requirements

1104 — Select required tools

1105 — Access cloud instructions

1106 — Execute assigned task (e.g. fender wrap)

1107 — Return to standby or proceed to next task

No → Proceed to next task — 1109

No

1108 — End

AUTOWRAP ROBOTICS: AI PLATFORM FOR AUTOMATED VEHICLE SURFACE TREATMENT USING HUMANOID ROBOTS

CROSS-REFERENCE TO RELATED APPLICATIONS

This application claims the benefit of U.S. Provisional Patent Application No. 63/837,197, filed on Jul. 2, 2025, the entire disclosure of which is incorporated herein by reference.

BACKGROUND OF THE INVENTION

The present invention generally relates to software-based robotic control systems for surface treatments. More specifically, it concerns an artificial intelligence (AI)-driven software platform that enables fully automated, precise application of:

Paint protection film (PPF)
Vinyl wraps
Ceramic coatings
Window tint films
Color PPF on exterior surfaces of automobiles (107), motorcycles, and marine vessels, including jet skis, boats, and yachts. The invention further relates to the AI-driven software platform enabling the automated, precise application of window tint films on commercial and residential building windows.

The invention further relates to AI-driven control of humanoid robotic platforms (501) equipped with dexterous robotic hands (1206) capable of grasping and manipulating standard manual surface treatment tools (110) such as:

Squeegees
Rollers
Heat guns
Blades

In addition to operating specialized interchangeable robotic tool heads, the AI Control Unit software autonomously executes surface treatment tasks by replicating human tool-handling techniques using real-time sensor feedback and adaptive motion control. This enables precise, flexible, and efficient surface treatments without the need for custom robotic hardware tools. (FIG. 2)

The system incorporates a human demonstration learning module, enabling professional wrapping experts to train the robotic system during supervised 2-3 day sessions. The robot captures human motion data including:

Tool angles
Pressure dynamics
Relief cut placement
Panel stretching techniques

Leveraging imitation and reinforcement learning algorithms, it progressively improves autonomous dexterity and precision. (FIG. 7)

Furthermore, the system supports advanced hybrid protective films that combine:

The stretchability and color variety of vinyl wraps
The durability and self-healing properties of paint protection films (PPF)

These hybrid films—such as those manufactured by 3M, Avery Dennison, or equivalent suppliers—require adaptive AI control of parameters including:

Heat application
Tension
Squeegee pressure

The AI dynamically modifies these parameters based on sensor feedback to ensure optimal adhesion, finish quality, and durability.

The invention is designed to be implemented on third-party robotic platforms, including:

Gantry robots
Fixed-base articulated robotic arms (105)
Mobile wheeled robots
Humanoid robots (501) such as Tesla's Optimus or Figure AI robot, leveraging their inherent capabilities through intelligent AI software control Tesla, Optimus, and Figure AI robot are referenced solely as illustrative examples of compatible robotic platforms; no affiliation, sponsorship, or endorsement by Tesla or Figure AI is implied or intended.

The system employs advanced artificial intelligence methodologies—including:

End-to-end neural networks
Imitation learning
Reinforcement learning

—to autonomously manage surface treatment operations and robotic tool actuation. This is accomplished entirely through software, without requiring development, customization, or ownership of any proprietary physical robotic hardware.

Current vehicle surface treatment methods—including the application of paint protection films (PPF), vinyl wraps, color PPF, ceramic coatings, and window tint films—are:

Predominantly manual
Labor-intensive
Prone to significant variability in quality Skilled installers often require multiple days per vehicle (107), and defects such as:

Air bubbles
Wrinkles
Misalignments cause costly rework and material waste. This reliance on manual labor limits scalability and operational efficiency.

Similarly, the application of window tint film on commercial and residential buildings is also a highly specialized and manual process, characterized by labor intensiveness, inconsistent quality across large window panes, and often requiring significant time and disruption in occupied spaces. Existing manual methods struggle with consistency across large surfaces and varying environmental conditions.

Traditional automotive painting, while still widely used, presents several limitations:

Paint jobs are permanent, making future color changes, branding updates, or design modifications costly and difficult to reverse without damaging the underlying coatings
Paint offers limited design flexibility compared to modern vinyl wraps
Paint is vulnerable to stone chips and scratches
Paint requires extensive surface preparation, long curing times, and substantial infrastructure investments (e.g., paint booths and environmental controls)
Paint processes raise environmental concerns due to volatile organic compound (VOC) emissions and hazardous waste generation Existing commercial systems and patent disclosures have addressed isolated aspects of automation in vehicle surface treatments, but none provide a fully integrated AI-driven software platform capable of controlling:

Multi-step robotic operations
Real-time quality assurance
Adaptive parameter optimization Fleet-wide scalability across diverse application environments, including commercial and residential window tinting These systems often depend on:

Specialized robotic hardware

Fixed-location industrial environments and lack flexibility in handling diverse multi-step treatments or vehicle types (107) or building window types from various material suppliers.

DETAILED DESCRIPTION OF THE INVENTION

In contrast, the present invention introduces a novel, mobile-compatible AI software platform capable of controlling surface treatment tools mounted on robotic arms (105) or humanoid robots (501). The invention integrates:

High-resolution 3D vision processing

Automated multi-tool coordination

Defect detection

Adaptive feedback control

Cloud-based learning

—to enable efficient, precise, and scalable treatments across a broad range of vehicle types (107) and deployment environments.

Relevant Prior Art and Limitations

The following prior art references demonstrate partial solutions or limited scope related to robotic surface treatment systems. However, none disclose or enable the fully integrated, AI-controlled, multi-tool, autonomous film application system described herein:

Commercial Paint Repair Systems (e.g., FANUC/3M):

Task-specific platforms primarily used for polishing. These systems lack:

Full-surface treatment integration

Automated tool switching

AI-based adaptive control

US20090008955A1:

Discloses vehicle wrap design generation software. However, it lacks:

Robotic actuation for application

Quality assurance or feedback integration

US20220380072A1:

Covers robotic film application within factory environments, but does not include:

Dynamic tool switching capabilities

AI-driven optimization or environmental adaptability

US20190002143A1:

Focuses on robotic handling of vehicle components, not full-surface exterior treatment or film application workflows.

U.S. Pat. No. 11,830,019B2:

Describes digital visualization and wrap design platforms, but they lack:

Robotic execution mechanisms

Automated quality control or defect correction

AutoWrap Robotics solves these shortcomings through a unified AI software control platform that:

Interfaces with a variety of robotic hardware (including humanoid robots (501))

Orchestrates real-time tool switching and defect correction

Processes high-fidelity 3D scan data for precise treatment paths

Scales across mobile deployments for use in shops, garages, or field service operations This invention addresses the automotive and marine markets' growing demand for a faster, more accurate, customizable, and environmentally friendly surface treatment alternative. It bridges the gap between:

Manual labor

Factory-only robotics

The limitations of traditional paint

—enabling scalable, modern appearance solutions through intelligent automation.

The AI Control Unit (1502) refers herein to the software and hardware system that autonomously manages robotic surface treatment operations.

BRIEF SUMMARY OF THE INVENTION

The present invention provides a fully automated, AI-driven software control platform designed to perform high-precision, multi-step surface treatment processes on vehicles (107) and marine vessels. These processes include the application of:

Paint protection film (PPF)

Color PPF

Vinyl wraps

Ceramic coatings

Window tint films

Custom graphics and decals

This invention also provides for the fully autonomous, AI-driven application of window tint films for commercial and residential buildings.

This invention addresses the limitations of traditional manual application methods and offers a superior alternative to both labor-intensive wrap installations and conventional automotive painting.

Unlike prior art systems relying primarily on fixed gantry-mounted robotic arms (105) or factory-floor automation, the present invention enables mobile, dexterous humanoid robots (501)—such as those commercially available or developed by third parties—to autonomously perform the complete vehicle (107) surface treatment workflow. (FIG. 5)

The AI control platform coordinates:

Humanoid locomotion

Tool manipulation

Real-time defect correction

—allowing flexible operations across diverse environments including garages, outdoor fleet yards, commercial and residential properties with windows to be tinted, and mobile service vans.

This enhanced mobility and tool-handling dexterity surpass the capabilities of traditional industrial robots, enabling scalable, on-demand, and high-precision treatments outside fixed production facilities. (FIG. 5)

At the core of the system is an AI control unit (1502) designed to interface with third-party robotic platforms such as:

Fixed-base robotic arms (105)

Mobile wheeled units

Humanoid robots (501)

The system orchestrates these robotic platforms to execute coordinated, autonomous surface treatments with high consistency and minimal human intervention.

Key Inventive Features Include:

Automated Multi-Tool Coordination

Through the use of an automated tool magazine or dexterous humanoid end-effectors (202), the system performs seamless tool switching mid-process to execute complex, multi-step treatments without manual input. (FIG. 4)

AI-Driven Defect Minimization

Real-time sensors and adaptive control algorithms allow the system to dynamically adjust application parameters— such as pressure, temperature, speed, and tool angle—during operation to reduce defects (601) including bubbles, wrinkles, and film misalignments. (FIG. 6)

Precision Squeegee Motion Control

The AI software directs squeegee tool heads to execute optimized motions simulating expert installer techniques, including vibration-assisted strokes at angles near 10 o'clock and 2 o'clock, improving film adhesion and reducing trapped air or fluid during installation. (FIG. 7)

Knifeless Tape Simulation for High-End Vehicle Applications

The system includes:

A specialized robotic tool head (110a) and/or

Leverages the inherent dexterity of humanoid robot hands (1206), combined with a path-planning algorithm —designed to simulate the functional effect of knifeless tape cutting systems.

This enables precise, damage-free film trimming directly on high-value vehicle surfaces (107), including luxury and exotic cars. This technique accomplishes accurate, nondestructive film separation without the use of:

Physical blades

Adhesive-backed cutting filaments

—thereby preserving the integrity of factory paint finishes while performing automated, controlled trim operations. (FIG. 7)

Human Demonstration Learning Module

Professional wrap installers conduct supervised multi-day training sessions during which the robot captures human motion data including:

Tool angles

Pressure dynamics

Relief cut placement

Panel stretching techniques

Leveraging imitation and reinforcement learning algorithms, it progressively improves autonomous dexterity and precision. (FIG. 7)

Hybrid Film Support

The system supports advanced hybrid protective films that combine:

Vinyl's conformability

PPF's durability and self-healing properties

AI dynamically adjusts:

Heat

Tension

Squeegee pressure

Curing protocols

—for optimal application quality.

Scalable Fleet Operation

Vehicle-specific wrap or coating templates are stored in a cloud-accessible database, allowing the system to process twenty-five (25) or more vehicles (107) per week with minimal reconfiguration time. (FIG. 8)

Fleet Visual Consistency and Alignment

The AI leverages comprehensive 3D scanning and proprietary algorithms to ensure that graphics, wraps, or coatings are applied with:

Identical positioning

Scale

Alignment across all vehicles (107) in a fleet, minimizing human variability and maintaining brand integrity.

6

Extended Runtime Capability

Designed for continuous operation exceeding sixteen (16) hours per day, the system reduces labor requirements and boosts throughput for commercial wrap and detail centers.

Real-Time Precision Decal and Graphic Application

The AI precisely aligns and applies custom decals and graphic overlays to vehicle surfaces (107), dynamically adjusting for contours and ensuring bubble-free, consistent placement across fleet vehicles (107) for branding purposes.

Quality Assurance Integration

Embedded visual and environmental sensors detect anomalies (601) during treatment, allowing the AI control unit (1502) to autonomously initiate real-time corrective actions. (FIG. 6)

Multi-Platform Robotic Compatibility

The software is designed to operate on a range of third-party robotic platforms without requiring proprietary hardware. This includes compatibility with:

Fixed-base articulated robotic arms (105)

Mobile wheeled units

Gantry robots

Humanoid robotic platforms (501) such as Tesla's Optimus or Figure AI robot

—where the invention leverages mobility and dexterity to perform tasks in both indoor and outdoor environments. (FIG. 5)

The AI Control Unit (1502) Comprises:

An imitation learning module trained using expert human demonstration data (FIG. 7)

A deep reinforcement learning engine that optimizes treatment parameters through self-improving robotic behaviors A vision-language-action interface enabling natural language input to be translated into executable robotic workflows A cloud-connected adaptive learning engine that aggregates and applies insights from a fleet of deployed systems to continuously improve treatment quality over time (FIG. 8)

Together, these components enable:

Autonomous tool head selection and motion planning

Real-time detection and correction of surface treatment defects (601) (FIG. 6)

Dynamic adaptation to vehicle geometry (107), environmental conditions, and user instructions The invention provides a more cost-effective, scalable, and environmentally friendly alternative to both traditional painting and manual wrapping.

Its software-centric design makes it suitable for deployment in:

Commercial auto shops

Detailing centers

Marine wrap services

Mobile application vehicles

Automated production lines

—including for high-end vehicle clients where precision and surface protection are mission-critical.

Definitions

Anchor Point:

The first location where vinyl is lightly pressed to begin adhesion.

Float Film:

Holding vinyl above the surface to reposition before tacking.

Zone/Segment:

A section of a panel separated by body lines or geometry for isolated wrapping.

Body Line:

A raised or recessed design crease used to divide wrap zones.

Tension Mapping:

Monitoring and controlling vinyl stretch percentage across the surface.

Stretch Limit:

The maximum safe vinyl stretch (usually 10-15%) before deformation.

Squeegee Path:

The direction and pattern of robotic motion to apply pressure and remove air.

Heat Range:

Vinyl temperature ranges:

Warm-up: 85-110° F.

Stretch: 150-180° F.

Post-heat: 180-200° F.

Pre-Stretch:

Controlled softening of vinyl before contouring complex surfaces.

Post-Heat:

Heating stretched vinyl zones to memory-set and prevent lifting.

Edge Tucking:

Folding vinyl into seams, trims, or recesses.

Trim Path:

A mapped line where vinyl will be cut to match vehicle shape.

Tool Change:

Swapping robotic tools (e.g., from squeegee to blade).

Edge Seal:

Applying adhesive or tape to prevent vinyl lift at panel edges.

Bubble Detection:

Locating trapped air under vinyl using pressure or vision sensors.

Micro-Puncture:

A small, controlled needle poke to release trapped air.

Zone Reset:

Re-floating and reapplying vinyl in one specific zone due to error.

Contour Detection:

Identifying surface curvature or panel geometry.

Panel Mesh:

3D digital map of the vehicle's (107) surface geometry.

Wrap Sequence:

The programmed order in which zones are wrapped.

Imitation Learning:

A machine learning paradigm where a robot learns to perform tasks by observing demonstrations from an expert (e.g., a human installer).

Reinforcement Learning:

A machine learning method where an autonomous agent learns to make optimal decisions by interacting with an environment to maximize a cumulative reward signal through trial and error.

Vision-Language-Action Models (VLA Models):

Artificial intelligence models that enable robots to translate high-level natural language commands and visual observations into complex, executable robotic action sequences.

Humanoid Robot:

A robot designed with a body shape that structurally resembles the human body, typically including a torso, head, two arms, and two legs, often capable of bipedal locomotion and dexterous manipulation.

AI Control Unit:

The comprehensive software and hardware system that autonomously manages robotic surface treatment operations by processing sensory data, executing advanced algorithms, and commanding precise robotic actions.

The vehicle (107) is positioned within a robotic gantry, workspace, or open environment where a 3D vision system (101)—utilizing stereo cameras and laser projectors (102)—scans the exterior surfaces of vehicles (107) or marine vessels, or window surfaces of commercial or residential buildings to generate a precise, high-resolution, real-time digital contour map. This detailed mapping accounts for:

Unique object geometries and aftermarket modifications for vehicles (107)

Window frame structures and architectural features for buildings

Figure 1:
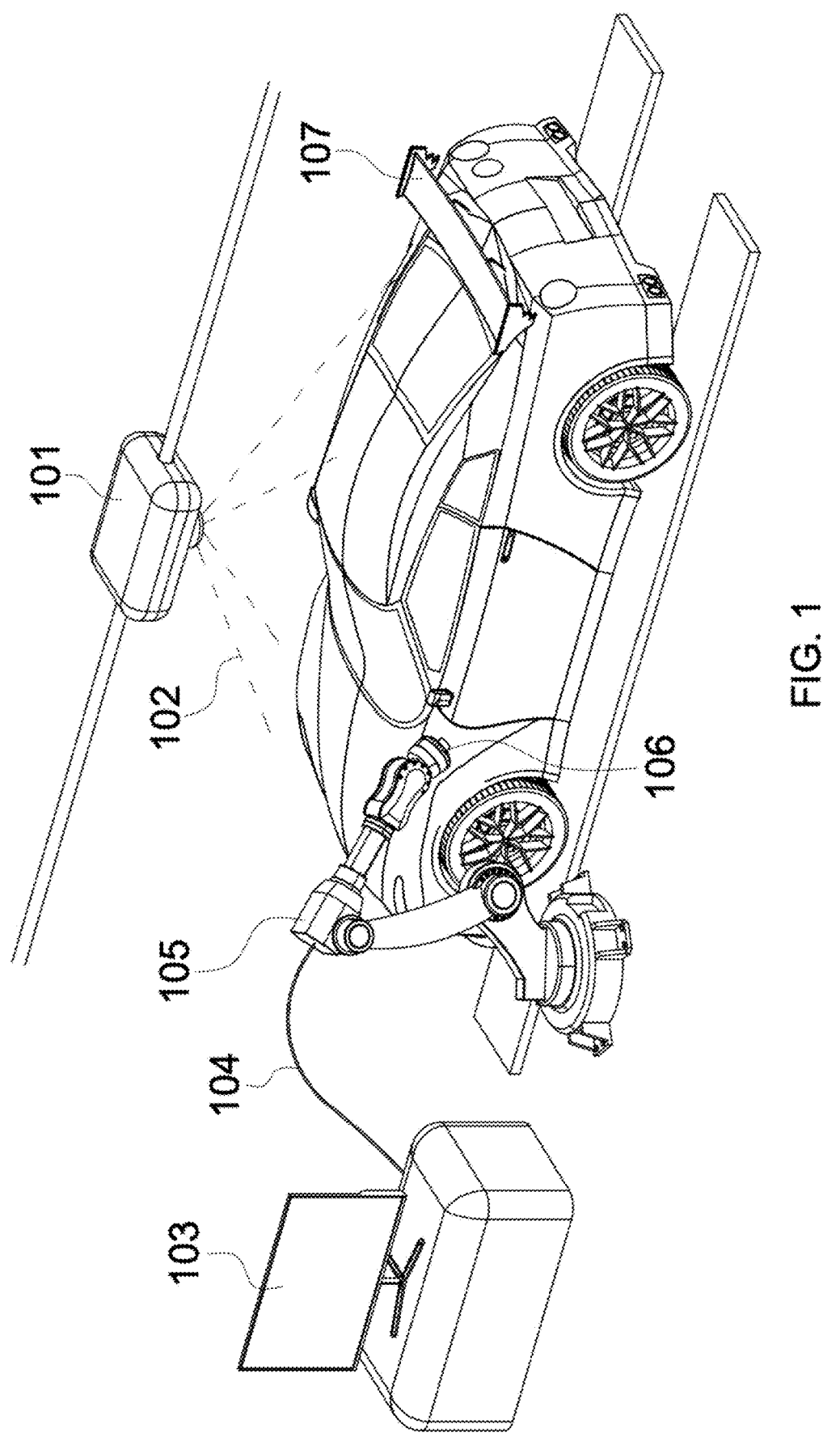
FIG. 1 is a schematic system view illustrating key components of the overhead scanning and robotic control setup, including the overhead 3D vision system (101), scanning field (102), visual display/control monitor (103), data/power cable (104), robotic arm (105), mobile or fixed base (106), and vehicle (107).

This enables tailored surface treatment plans with reduced errors. (FIG. 1)

The AutoWrap Robotics software (1502) retrieves a vehicle-specific treatment template from a cloud-based database, identified via barcode, Vehicle Identification Number (VIN), or RFID tags. This template defines:

The exact wrap or coating plan

Tool paths

Material specifications optimized for the specific vehicle (107)

This facilitates consistent and scalable treatment workflows.

The AI Control Unit (1502) software commands the connected robotic platform (105) to select and switch interchangeable tool heads designed for:

Paint protection film (PPF) installation

Vinyl wrapping

Ceramic coating application

And other surface treatments

Figure 4:
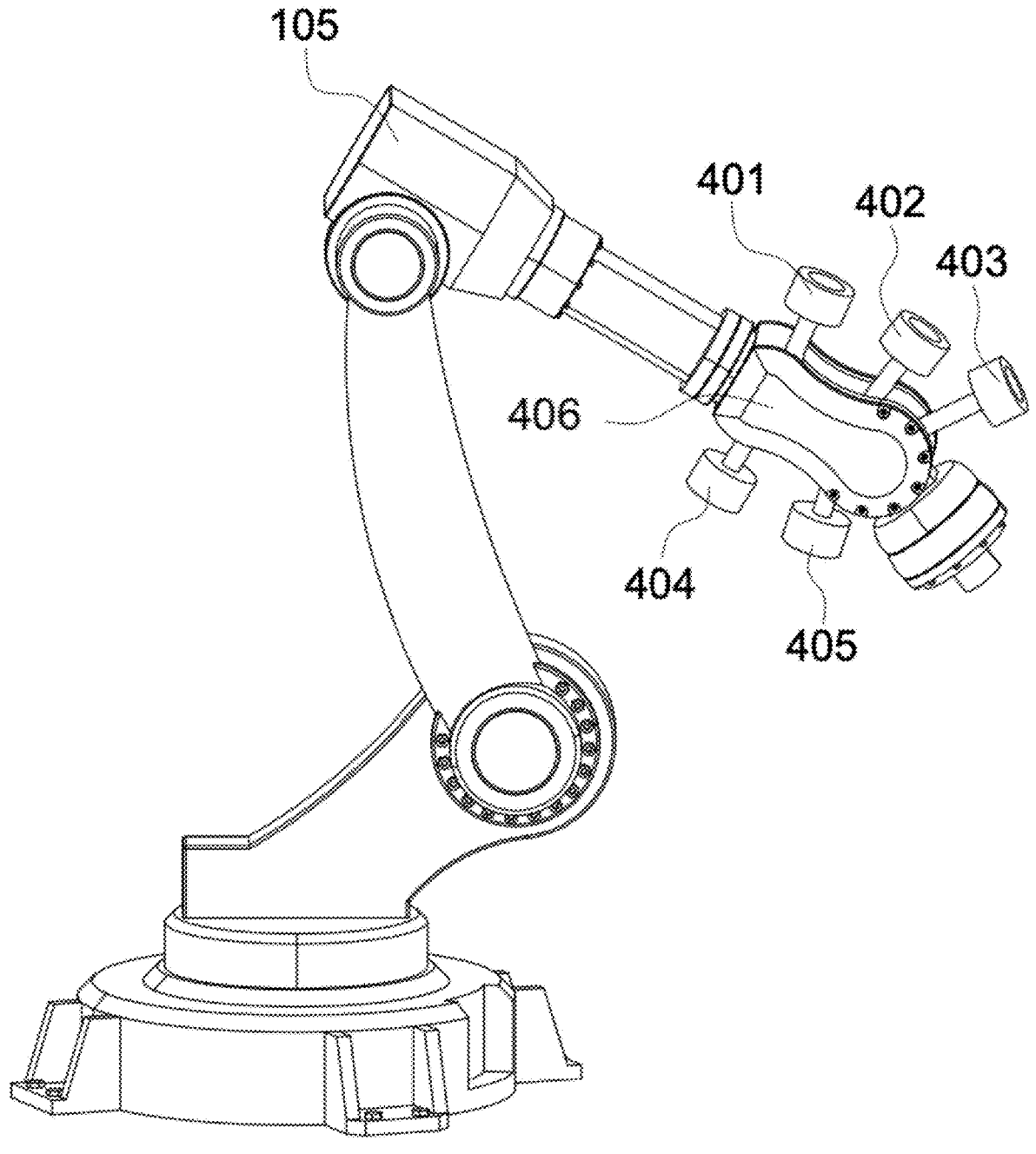
FIG. 4 illustrates the tool mounting interface (406) of the robotic arm (105), showing multiple detachable tools including: Bubble Popper/Air Ejection Tool (401), Dust Detection Light Wand (402), Wrap Edge Pre-Heater (403), AI-Guided Masking Tape Dispenser (404), and Detachable Magnetic Panel Marker (405).

Tool selection includes both:

Automated tool magazine (400) swapping (FIG. 4)

Figure 7:
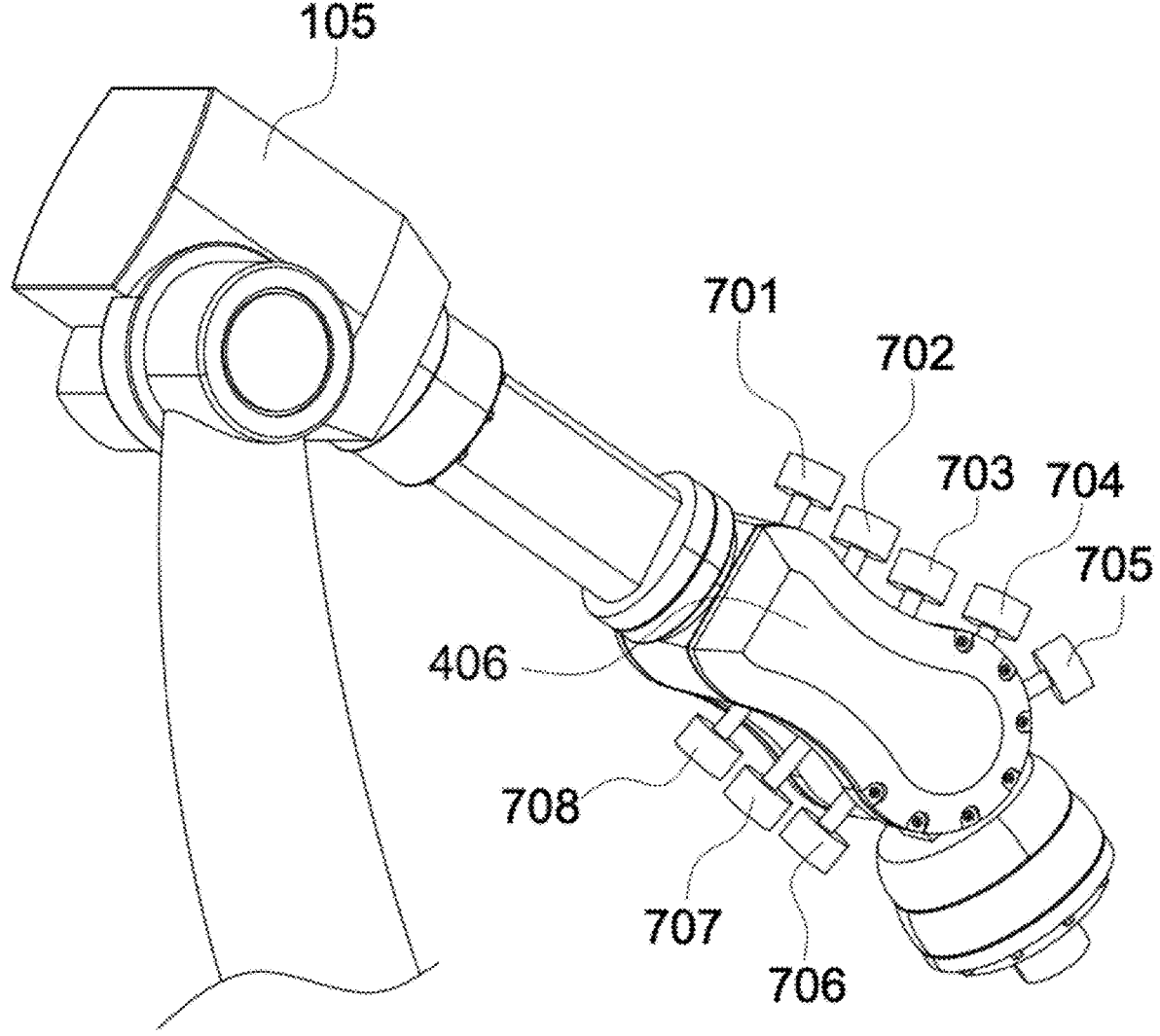
FIG. 7 details the tool mounting interface (406) and interchangeable tool heads on the robotic arm (105), including: Vinyl Roller Tool Head (701), Ceramic Coating Tool Head (702), Paint Protection Film Applicator Tool (703), Heated Film Tucking Spatula (704), Precision Cutter Tool (705), Edge-Sealing Roller (706), Film Removal Tool (707), and Laser Alignment Projector (708).

Dexterous manipulation by humanoid robot hands (1206) (FIG. 7)

Figure 2:
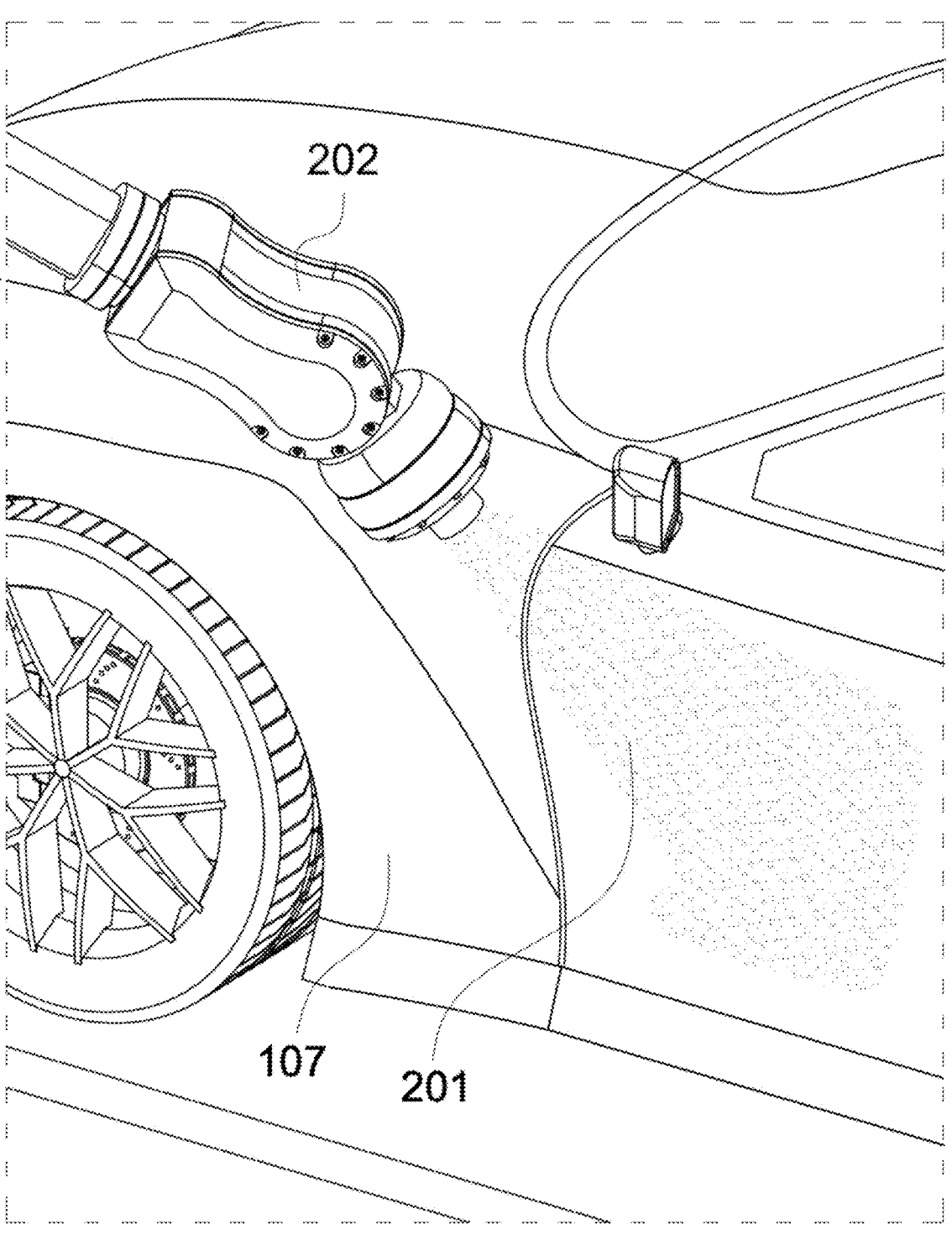
FIG. 2 shows a perspective of the robotic end-effector (202) applying a fine mist spray pattern (201) to the vehicle (107), illustrating coating application.

This allows handling of both automated and manual-style tools (FIG. 2).

Figure 10:
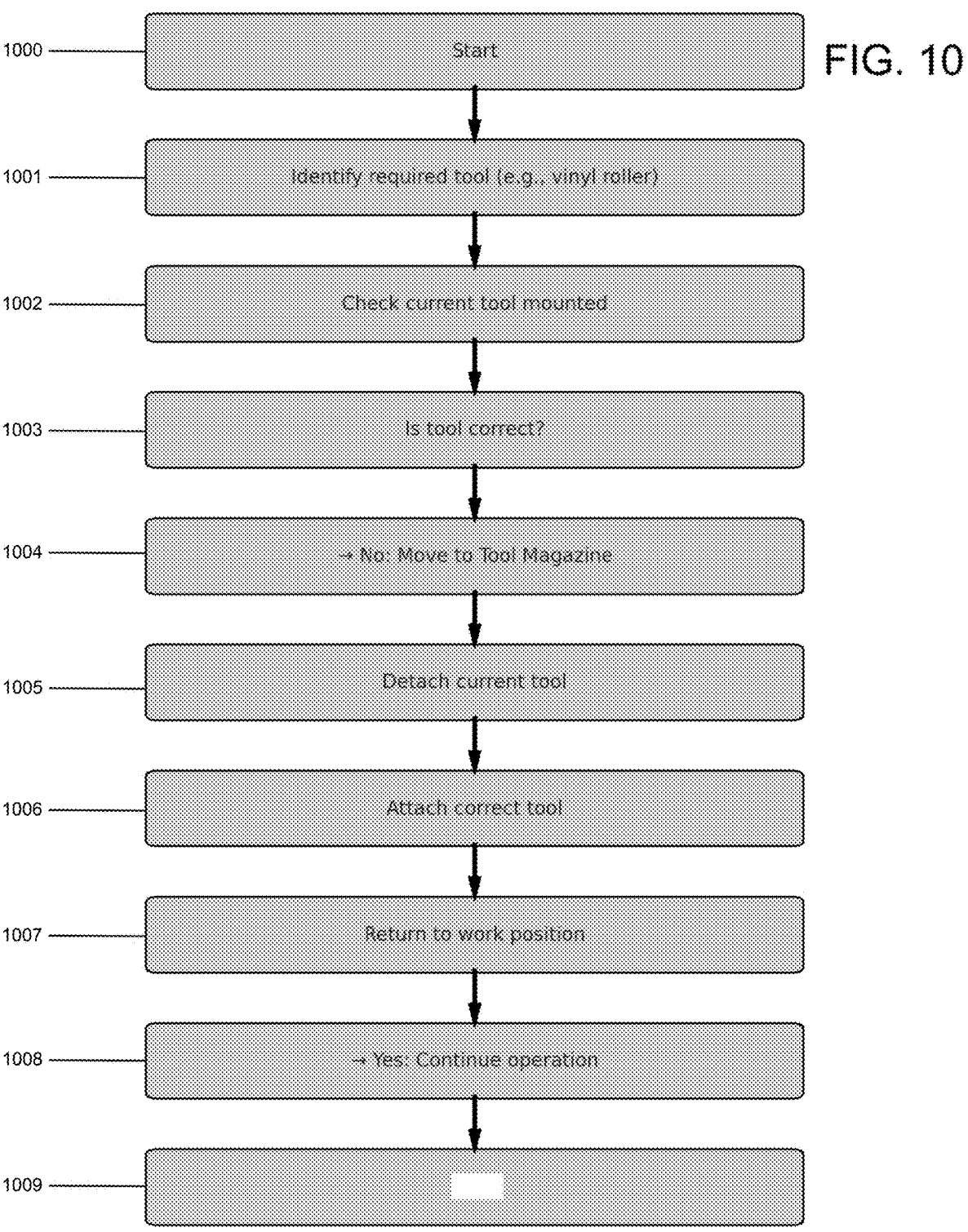
FIG. 10 is a flowchart illustrating automated tool head switching logic, including: Start (1000), Tool Identification (1001), Tool Check (1002), Decision Node (1003), Move to Magazine (1004), Detach Current Tool (1005), Attach Correct Tool (1006), Return (1007), Continue Operation (1008), and End (1009).

The precise workflow for automated tool head auto-switching is further detailed in the flow diagram of FIG. 10. Process steps:

The system (1502) identifies the required tool (e.g., vinyl roller (701)). It checks which tool, if any, is currently mounted. If the mounted tool is not correct:

a. The robot (105) moves to the tool magazine (400)

b. Detaches the current tool c. Attaches the correct tool d. Returns to the work position and continues If the correct tool is already mounted, the robot (105) continues the operation without switching. This seamless auto-switching minimizes downtime and human intervention during complex, multi-step applications.

Integrated multi-modal sensors (1501) continuously provide feedback during application, monitoring for defects (601) such as:

Bubbles

Wrinkles

Coating inconsistencies

The AI Control Unit (1502) dynamically adjusts:

Robotic movements

Tool parameters

Figure 6:
FIG. 6 highlights detection of a surface defect (601) on the vehicle (107) using a robotic arm (105) mounted on a base (106), applying spray pattern (201) as part of defect treatment.

—with low latency to correct imperfections autonomously, ensuring high-quality outcomes and minimizing material waste. (FIG. 6)

The system (1502) supports processing a wide range of vehicle types (107) as well as window surfaces of various commercial and residential buildings—including:

Cars

Trucks

Buses

Motorcycles

Trailers

Marine vessels

Robotic arms (105), gantries, or humanoid robots (501) are mounted on adjustable tracks or mobile platforms (106) to accommodate various sizes and hull contours. This enables scalable fleet operations with consistent quality.

The automated vehicle surface treatment proceeds through the following AI-managed steps (FIG. 3):

1. Vehicle Positioning (901): The vehicle (107) is driven or placed into the workspace. Adjustable mounts or supports may be used for stabilization.

2. 3D Surface Scanning (902): Stereo cameras and laser projectors generate a high-resolution 3D digital map of the exterior. This captures contours, curves, and panel edges precisely.
   (Relates to "SCAN" (301) in FIG. 3)

3. Template Retrieval and Job Setup (903): The system (1502) retrieves the wrap/coating plan from the cloud via barcode, VIN, or RFID.
   (Relates to "GENERATE WRAP PLAN" (302) in FIG. 3)

4. Automated Tool Head Selection (906): AI (1502) commands selection of the correct tool heads from the automated tool magazine (400) or onboard storage. (FIG. 4)

5. Film or Coating Application (907): The robotic platform (105) follows the 3D map and instructions to apply materials (1401) with precision. Heat, pressure, tension, and motion are actively AI-controlled.
   (Relates to "APPLY FILM" (303) in FIG. 3)

6. Real-Time Quality Monitoring and Adjustment (908): Sensors (1501) detect and correct defects (601) like bubbles and wrinkles.
   (Relates to "QUALITY CONTROL" (304) in FIG. 3)

7. AI-Based Decision and Correction Process (909): Sensor input (visual, pressure, temperature) is processed using learned response patterns. Example actions:
   Lifted edge→Heated spatula press/retract cycle
   Bubble→Heat gun pulse+spiral vibration squeegee motion
   Corrective actions are executed within milliseconds.

8. Multi-Step Treatment Completion (910): AI (1502) manages mid-process tool switching as needed.

9. Final Inspection and Data Logging (911): Final quality check and cloud logging ensure optimization and fleet tracking.

Figure 3:
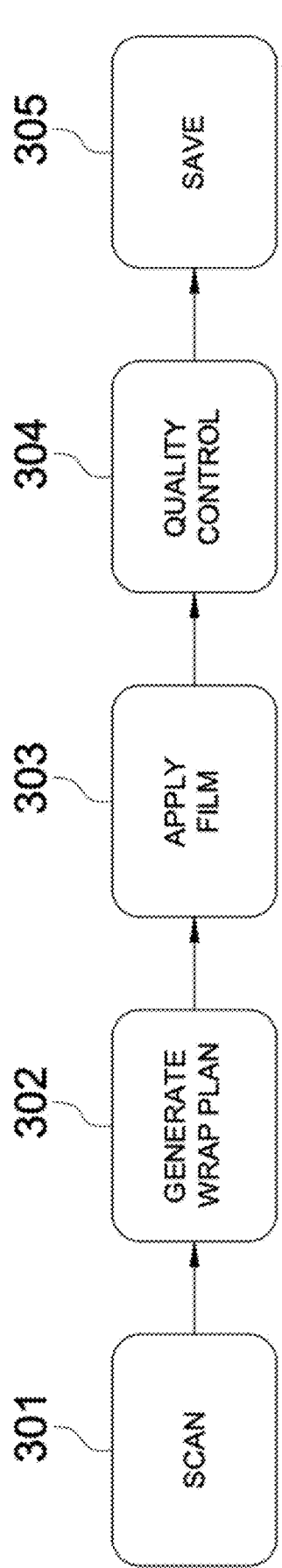
FIG. 3 is a flowchart illustrating the automated surface treatment process, including scanning (301), wrap plan generation (302), film application (303), quality control (304), and data saving (305).

(Relates to "SAVE" (305) in FIG. 3)

Figure 9:
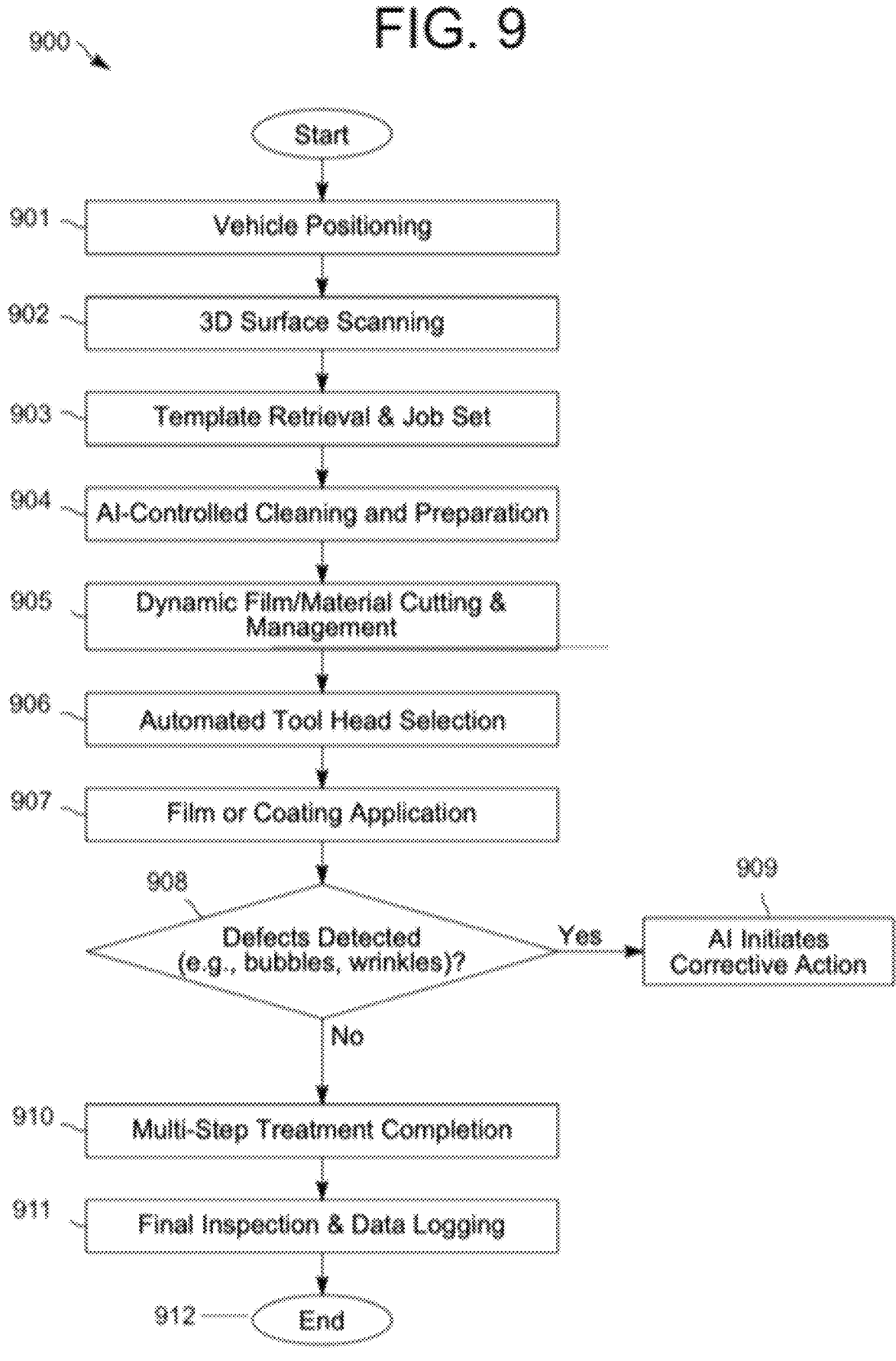
FIG. 9 is a flowchart depicting the full autonomous surface treatment workflow: Start (900), Vehicle Positioning (901), 3D Surface Scanning (902), Template Retrieval & Job Set (903), AI-Controlled Cleaning (904), Film Cutting & Management (905), Tool Head Selection (906), Film or Coating Application (907), Defect Detection (908), AI Correction (909), Treatment Completion (910), and Final Inspection & Logging (911).

An alternative or detailed workflow representation is shown in FIG. 9.

This includes:

Start (900)

Vehicle Positioning (901)

3D Surface Scanning (902)

Template Retrieval & Job Set (903)

AI-Controlled Cleaning and Preparation (904)

Dynamic Film/Material Cutting & Management (905)

Automated Tool Head Selection (906)

Film or Coating Application (907)

Defect Detection Decision (908):

If defect detected→AI Initiates Corrective Action (909), loops back

If no defect→proceeds to step 10

Multi-Step Treatment Completion (910)

Final Inspection & Data Logging (911)

End (912)

AI Hardware and Data Infrastructure:

The AutoWrap Robotics AI Control Unit (1502) is powered by a multi-layered AI framework, implemented using a suitable programming language, and executed on high-performance edge computing hardware. This architecture enables:

Real-time sensor data processing

Complex model inference

Low-latency robotic actuation

These capabilities are critical for handling delicate materials and dynamic environments.

Training Dataset Overview (500+ Hours):

Collected from professional installers, the dataset includes:

High-Fidelity Motion Capture:

Motion capture systems (e.g., optical or depth sensor-based systems) capture precise 3D motion (position, acceleration, tool orientation).

Tracks hands (1206), wrists, tools (110) during wrapping.

Force/Torque Sensor Readings:

From gloves/tools.

Measures pressure, shear, torque for compliant handling.

Thermal Imaging Data:

Infrared sensors record surface and material temperature during heat application.

Enables optimized dwell time and patterns.

High-Resolution Visual Data:

Stereo cameras capture the applied film's condition.

AI (1502) learns visual defect detection (601) and wrap quality.

These synchronized, annotated multi-modal streams serve as the foundation for both:

Imitation Learning

Reinforcement Learning (Explained in detail herein)

Figure 5:
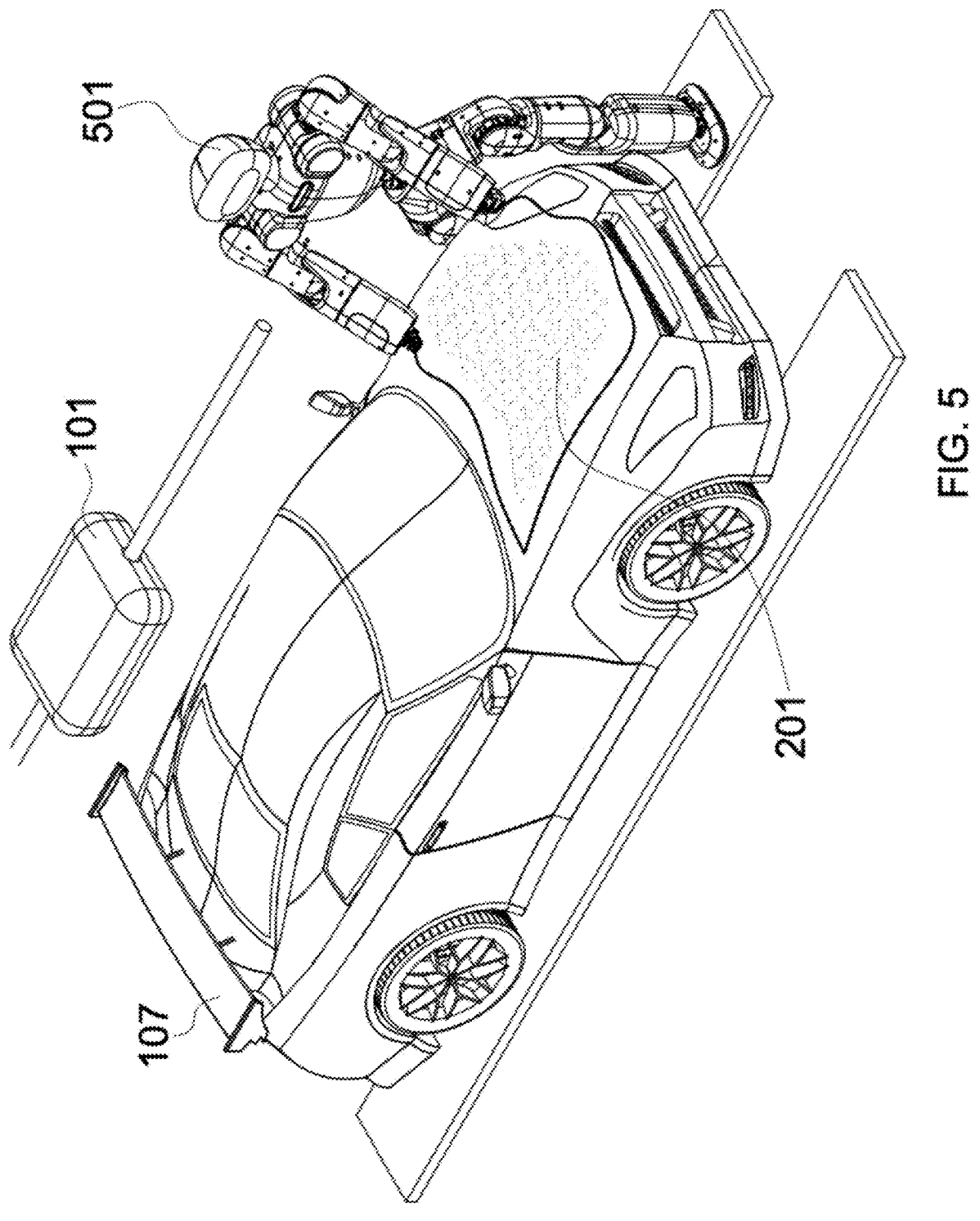
FIG. 5 shows a humanoid robot (501) interacting with a vehicle (107) using a fine mist spray (201), aided by the overhead 3D vision system (101).

The AutoWrap Robotics software (1502) is designed to operate seamlessly on third-party humanoid robotic platforms (501), specifically Tesla's Optimus robot and Figure AI robot, leveraging their native mobility and dexterity to perform autonomous vehicle surface treatments beyond fixed gantry setups (FIG. 5). The AI Control Unit (1502) adapts control algorithms to Tesla Optimus's and Figure AI robot's kinematic and dynamic structures, enabling precise tool manipulation coordinated with the robots' joints and actuators. This sophisticated AI control platform (1502) overcomes inherent challenges in applying compliant, deformable materials and precise temperature-sensitive coatings to complex, varied vehicle surfaces (107) by employing advanced AI-driven methodologies for:

Dynamic vinyl stretching

Precise heat gun temperature control

Real-time micro-bubble detection and correction (601) during application

Further detailed explanation of these unique AI capabilities is provided herein.

Unique AI Handling of Vinyl Stretching

Applying vinyl films, such as paint protection film (PPF) or color wraps, necessitates precise control over material deformation. Unlike rigid assembly tasks, vinyl stretching involves dynamic, real-time adaptation to complex contours and material compliance. AutoWrap Robotics AI (1502) addresses this through:

Real-time 3D Deformable Surface Tracking:

Neural networks running efficiently on edge computing hardware continuously fuse data from:

3D LiDAR (e.g., depth mapping sensors for coarse-to-fine depth mapping)

High-resolution stereo vision cameras (101) (leveraging structured light for fine detail capture)

Integrated tactile and force/torque sensors (1501)

This fused data feeds a recurrent neural network (RNN) or Transformer-based architecture that generates a dynamically updated 3D mesh of the vinyl (1401), augmented with learned material properties inferred from real-time haptic feedback. This rapid processing on the edge computing hardware allows for instantaneous estimation of localized strain and stress within the vinyl (1401), predicting potential overstretching or understretching before visible defects (601) manifest on the film surface.

Dynamic Mesh Reconstruction and Material Property Inference:

Fused sensor data feeds a real-time neural network generating a dynamically updated 3D mesh augmented with learned material properties. This estimates localized strain and stress within the vinyl (1401), identifying potential overstretching or understretching before visible defects (601) occur.

Adaptive Force and Compliance Control for Deformation Management:

The humanoid robot's (501) advanced force control architecture, leveraging impedance control principles, is dynamically tuned by AI (1502). Learned compliance profiles—derived from machine learning models trained via imitation learning on expert human demonstrations (from the 500+ hour dataset) and further refined through reinforcement learning in high-fidelity simulation—dictate dynamic stiffness and damping. The low-latency edge inference ensures that the AI (1502) can apply variable pressure and adapt movements instantly, mimicking human dexterity to stretch, conform, and smooth vinyl (1401) over complex surfaces (compound curves, sharp edges, recessed areas), effectively avoiding trapped air, tears, or overstretching. This dynamic adjustment is performed within single-digit milliseconds due to the edge computing capabilities.

Predictive Deformation Modeling:

Using generative AI and physics-informed neural networks (PINNS) implemented in an AI framework, the system (1502) predicts vinyl deformation based on anticipated robotic movements, forces, and thermal conditions. This enables proactive adjustments to trajectory, speed, and force to pre-stretch or relax the film (1401) before complex geometric transitions, significantly reducing the need for reactive corrections during application.

Coordinated Multi-Point Manipulation:

Humanoid robot hands (1206) enable sophisticated two-handed and multi-finger manipulation, with one hand (1206) "pinning" the film section (1401) and the other applying pressure and stretch via squeegee or roller end-effector (202). This allows seamless application around challenging vehicle features beyond single-arm robot capabilities.

Precise AI-Driven Temperature Control for Heat Guns

Heat application is critical in vinyl installation, where overheating can damage the film (1401) or paint. AutoWrap Robotics ensures precision through:

Closed-Loop Thermal Feedback:

Heat gun end-effectors or thermal sensor arrays incorporate high-resolution infrared thermal cameras providing real-time localized temperature mapping of vinyl (1401) and vehicle surfaces (107).

AI-Driven Predictive PID Control:

Advanced PID control loops enhanced by predictive machine learning dynamically modulate heat gun output power, distance, and dwell time, factoring:

Vinyl or coating type

Ambient temperature

Panel thermal conductivity

Desired malleability

This prevents scorching or under-heating, ensuring optimal pliability and adhesion.

Learned Thermal Profiles:

Heat gun end-effectors or thermal sensor arrays incorporate high-resolution infrared thermal cameras, with data processed by the edge computing hardware for real-time localized temperature mapping. Predictive PID control loops, enhanced by machine learning algorithms trained on optimal thermal profiles derived from the 500+ hours of expert human demonstration data, dynamically modulate heat gun output power, distance, and dwell time. This on-device inference ensures sub-degree Celsius precision, preventing scorching or under-heating, and guarantees optimal pliability and adhesion by instantly adapting to vinyl or coating type, ambient conditions, and panel thermal conductivity.

Dynamic Heat Distribution Planning:

AI (1502) optimizes robotic arm (105) and heat gun paths for geometric coverage and uniform heat distribution, generating complex curvilinear motions to evenly warm large surfaces and focus intense heat on areas requiring significant stretching or tight recess conforming.

AI-Powered Micro-Bubble Detection and Correction

Surface defects (601) such as micro-bubbles compromise aesthetics and protection. The system (1502) implements advanced detection and autonomous correction (FIG. 6):

High-Resolution Multi-Spectral Vision:

Integrated cameras (101) with specialized lenses and multi-spectral imaging (visible, polarized, UV light) or structured lighting enhance visibility of subtle surface imperfections, including translucent bubbles and minor wrinkles difficult to see under normal lighting.

14

Deep Learning-Based Anomaly Detection:

Integrated cameras (101) with specialized lenses and multi-spectral imaging (visible, polarized, UV light) or structured lighting provide high-resolution input to the edge computing hardware. Deep Learning-Based Anomaly Detection, specifically Convolutional Neural Networks (CNNs) trained in an AI framework on extensive datasets of surface imperfections, identify and localize microscopic bubbles and other flaws (601) with superior accuracy compared to human inspection.

Autonomous Rework and Iterative Correction:

Upon detecting a micro-bubble and mapping its 3D coordinates (enabled by the rapid vision processing of the edge computing hardware), the AI control algorithms (1502) autonomously initiate targeted rework.

Targeted re-squeegeeing with precise pressure and movement displaces trapped air For persistent bubbles (601), a micro-needle end-effector (202) performs a localized puncture followed by targeted heat application and re-squeegeeing All actions are orchestrated by the low-latency control loops on the edge computing hardware to invisibly seal the puncture Continuous Quality Assurance Loop:

AI (1502) rescans corrected areas iteratively to confirm bubble removal and correction quality, with further attempts or human review flagged if necessary. Continuous rescans and iterative corrections are managed by the edge computing hardware onboard, minimizing workflow interruptions and maintaining seamless application.

Preventative Learning and Process Optimization:

Operational feedback updates AI models to identify defect formation patterns related to:

Vehicle geometry (107)

Film batches

Environmental conditions

This ongoing learning enables the AI (1502) to refine strategies, optimize robot trajectories, tool pressures, and heat profiles to prevent defects (601) before they occur.

Humanoid Robot Deployment Embodiment

A key embodiment commands humanoid robots (501) such as Tesla's Optimus and Figure AI robot to perform vehicle surface treatments. The AI (1502) adapts learned human techniques to the robot's (501) kinematics and torque limits, enabling flexible deployment in non-factory environments such as customer garages and outdoor vehicle fleets (107). (FIG. 5) This adaptive learning supports continuous refinement based on accumulated operational data and additional human demonstrations. Such integration allows flexible deployment scenarios including mobile service units performing on-demand treatments at customer locations. For example, a licensed shop owner may command a mobile humanoid robot (501) via user interface to autonomously travel to a customer's premises (e.g., home garage), execute specified treatments precisely and unsupervised while adhering to safety and operational protocols, efficiently complete jobs, then return or prepare for transport. Humanoid robot platforms (501) thus extend commercial reach, enabling mobile deployment in garages, outdoor fleet yards, and other sites inaccessible to fixed gantry systems. (FIG. 5)

Humanoid Robot Task Assignment Logic

Figure 11:
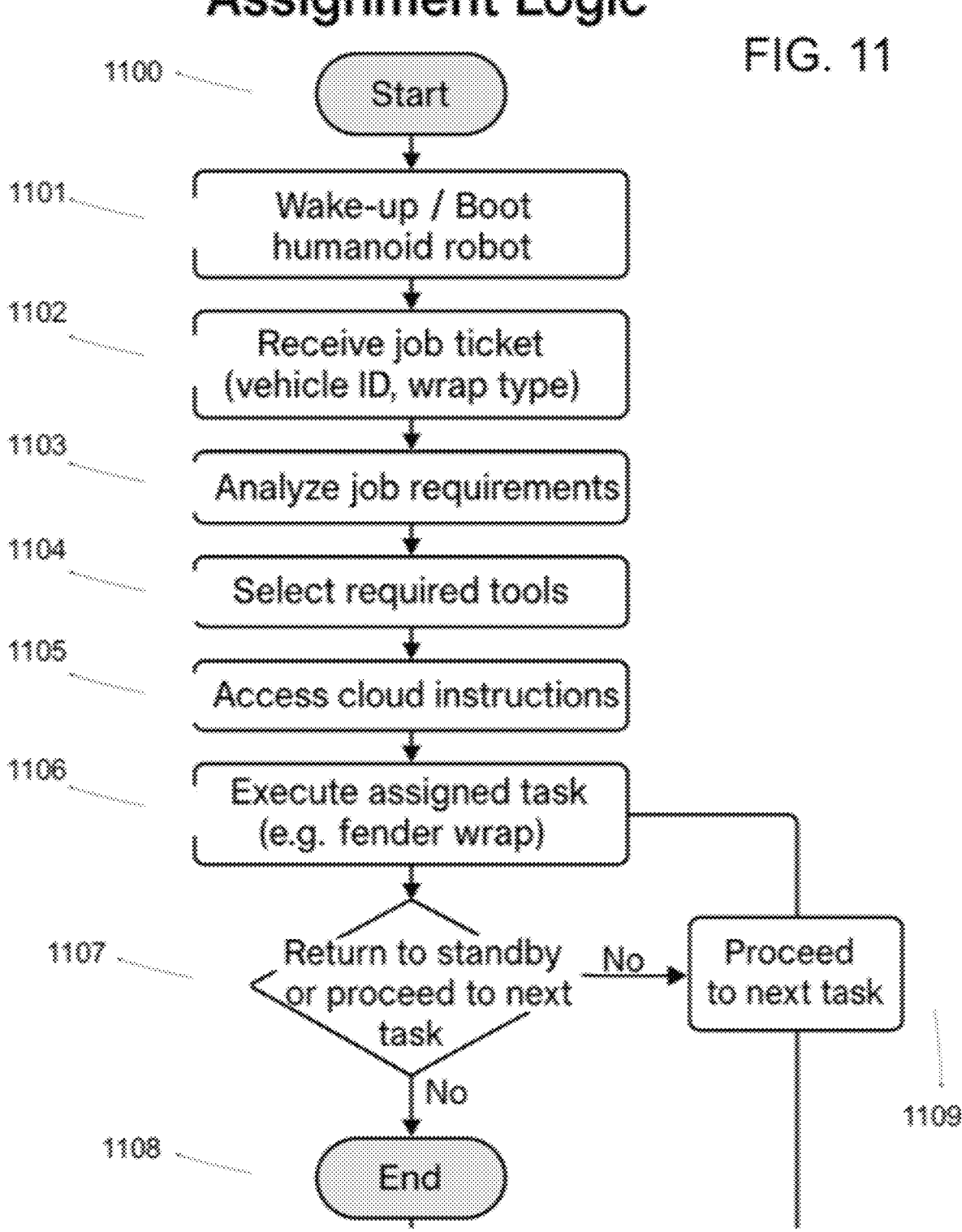
FIG. 11 is a flowchart representing the task logic of a humanoid robot: Start (1100), Boot Sequence (1101), Receive Job Ticket (1102), Analyze Requirements (1103), Select Tools (1104), Access Cloud Instructions (1105), Execute Task (1106), Task Completion Logic (1107), End (1108), and Next Task (1109).

The internal operational logic for assigning and managing tasks to humanoid robots (501) is further elucidated in the flow diagram of FIG. 11. This process initiates with the robot's (501) wake-up or boot sequence. The robot (501) then receives a specific job ticket, containing details such as vehicle ID (107) and the type of wrap or treatment required. Subsequently, the AI (1502) analyzes these job requirements, selects the necessary tools (110), and accesses specific cloud instructions pertinent to the task. The robot (501) then proceeds to execute the assigned task (e.g., a fender wrap). Upon completion of the task, the system (1502) performs a quality assurance check on its own work. Based on the QA outcome, the robot (501) either returns to a standby state or, if there are further tasks in the job ticket or queue, proceeds directly to the next assigned task, demonstrating autonomous workflow progression.

Specialized Humanoid Robot Postures for Complex Access

Figure 12:
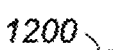
FIG. 12 is a perspective view of a humanoid robot (1201) in a seated, criss-cross leg position performing a low-access treatment task on the vehicle (107), showing vision sensors (1203), cable spool (1204), articulated arms and fingers (1206), and attached tools (110) as part of the overall system (1200).

Further enhancing the humanoid robot's (501) versatility, reach, and efficiency in complex environments, the AI Control Unit (1502) enables the robot (501) to adopt specialized non-standard postures for improved access to challenging vehicle (107) areas. As depicted in FIG. 12, this includes the capability for the humanoid robot (1201) to autonomously transition into a seated, criss-cross leg position. This unique posture is particularly advantageous for performing precise film application or detailing in low-lying sections such as rocker panels, lower bumper areas, wheel arches, and intricate underbody contours, which are typically difficult to reach from a standing position. The AI (1502) dynamically adjusts the robot's (1201) balance, joint kinematics, and tool manipulation parameters to maintain stability and apply consistent force and motion while operating in this seated configuration, thereby optimizing efficiency and quality for highly contoured or confined geometries and minimizing the need for external positioning equipment or human intervention.

Environmental Adaptation and Dynamic Parameter Adjustment

The software (1502) integrates real-time environmental sensor data (1501)—including ambient temperature, humidity, wind speed, and surface contamination—to dynamically adjust critical application parameters such as heat intensity, applied pressure, and coating formulation. This adaptive control ensures consistent, uniform, and optimal surface treatment performance across varied outdoor and mobile operating conditions, compensating for environmental variability to maintain high-quality results.

Overview of Software Architecture and Robotic Platform Integration

This section details the core software components, AI-driven operational functions, and specialized hardware tool heads integrated within the AutoWrap Robotics system. The invention centers on a sophisticated AI control software platform (1502) designed to seamlessly interface with and command various third-party robotic platforms (105)—including humanoid robots (501) such as Tesla's Optimus and Figure AI robot—enabling advanced automation of vehicle surface treatments. The software (1502) is built upon a modular architecture enabling easy integration with any robotic platform (105) that provides standard control interfaces and adheres to common communication protocols, ensuring future compatibility and expandability beyond currently available models.

Compatible Robotic Platforms:

The AutoWrap Robotics software (1502) is architected to operate across a variety of robotic carriers, including but not limited to:

Fixed-base articulated robotic arms (105) (commonly with six or more degrees of freedom)

Mobile wheeled robots

Gantry robots

Mobile humanoid robots (501)

These third-party robotic platforms (105) primarily serve as carriers for specialized interchangeable tool heads (701-708) and are controlled exclusively via the AI Control Unit software (1502). The inventive aspect resides primarily in the AI-driven software control system (1502) and integration of specialized surface treatment tool heads (701-708) rather than the physical robotic hardware itself.

Specialized Interchangeable Robotic Tool Heads:

The AI Control Unit (1502) commands a suite of specialized, interchangeable robotic tool heads, each designed for precise, efficient execution of various surface treatment operations, including but not limited to (FIG. 7):

Robotic Heat-Controlled Roller Tool Head (701): For vinyl wrap application with AI-managed temperature and pressure regulation.

Robotic Rotating Mist Sprayer and Buffing Wheel Tool Head (702): For ceramic coating application and polishing, with AI-regulated spray and buff parameters.

Robotic Paint Protection Film (PPF) Applicator Tool Head (703): Incorporates integrated heat and pressure sensors, guided by AI (1502) for optimal film application.

Robotic Heated Flexible Spatula Tool Head (704): For precise film tucking under trim edges, controlled via AI temperature and pressure modulation.

Robotic Precision Retractable Cutting Tool Head (705): Enables clean trimming using AI-guided trajectories based on real-time 3D surface scan data.

Robotic Heat-Activated Rolling Device Tool Head (706): Bonds film edges applying AI-controlled heat and pressure.

Robotic Thermal and Mechanical Film Removal Tool Head (707): Safely removes existing films without damage, under AI control (1502).

Robotic Laser Alignment Projector (708): Projects visual guides facilitating human oversight and AI calibration.

Robotic Motorized Vinyl Tensioning Tool Head: Stretches and maintains vinyl film tension with AI-regulated control for wrinkle-free application.

Robotic Vibration-Assisted Squeegee Tool Head: Uses AI-controlled micro-oscillations to remove air bubbles and enhance adhesion.

Robotic Controllable Heat Gun Tool Head: Delivers precise, localized, AI-regulated heat application.

Robotic Glove-Like Dexterity Tool Head:

Employs soft robotic actuators composed of flexible pneumatic artificial muscles and embedded force-sensitive resistors (FSRs) to provide tactile feedback.

This tool mimics human hand motions by fusing real-time pressure, force, and position data, enabling delicate film (1401) manipulation and precise edge tucking on complex surfaces.

Figure 13:
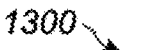
FIG. 13 is a close-up perspective view showing articulated fingers (1301) operating a specialized gripper tool (1302), its sub-part (1303), and a precise cut in the wrap material (1304) as part of the overall system (1300).
Figure 14:
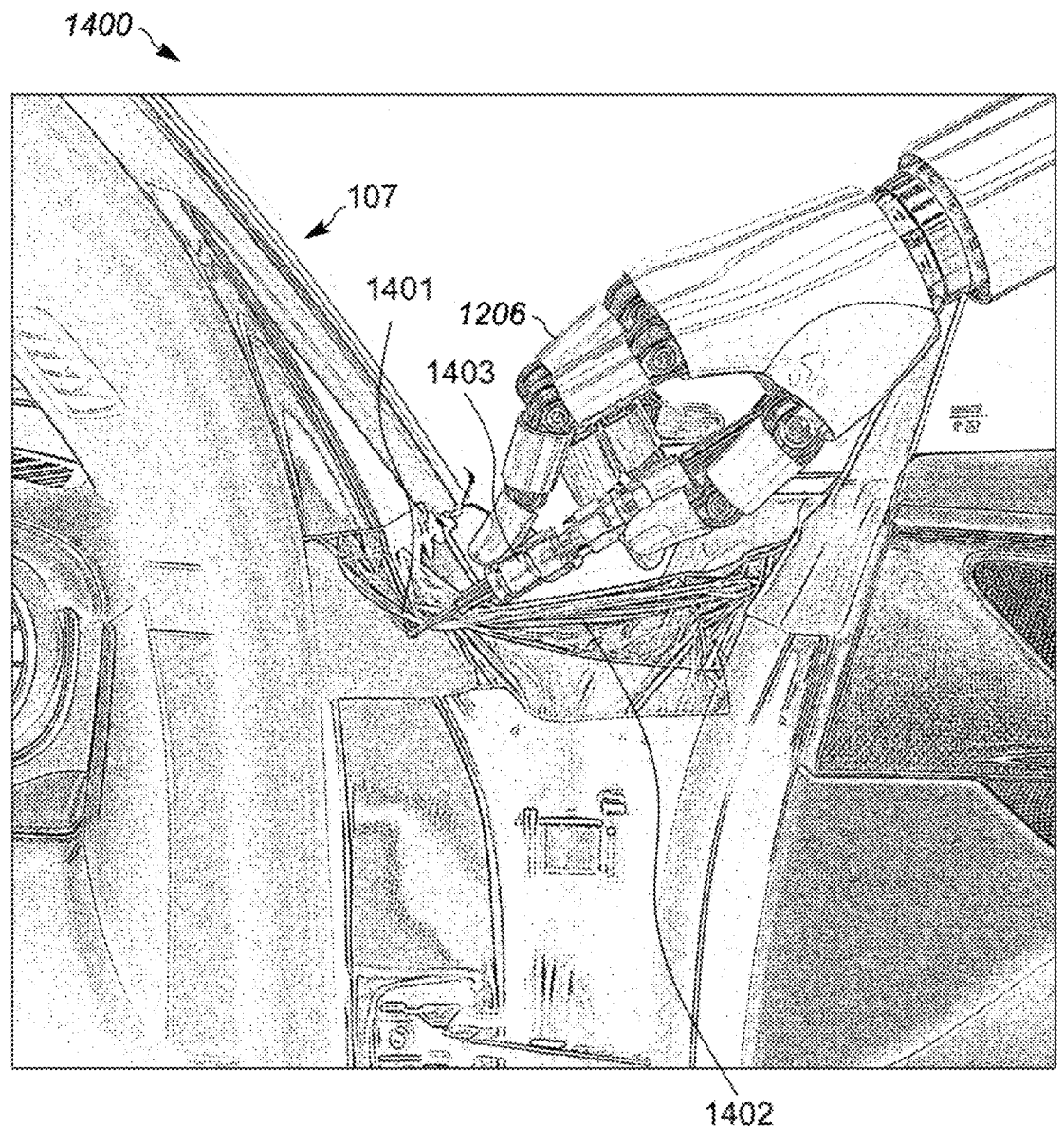
FIG. 14 depicts the application of film into recessed areas such as door jambs, including the vehicle (107), applied material (1401), inner structure (1402), tucking tool (1403), and articulated robotic fingers (1206), within the system view (1400).
Figure 15:
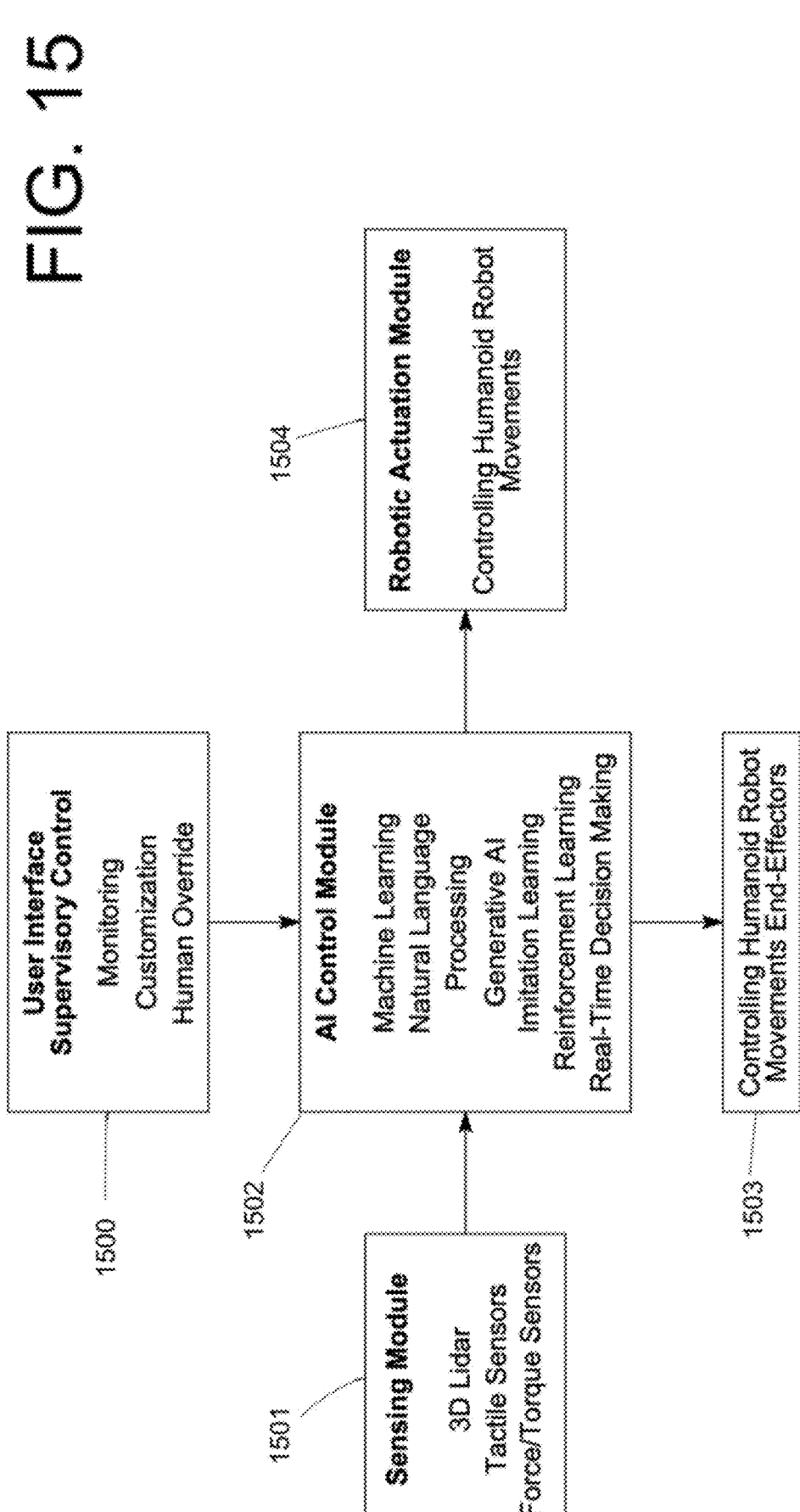
FIG. 15 is a flowchart illustrating the AI-based system architecture of AutoWrap Robotics, including the User Interface Supervisory Control Module (1500), Sensing Module (1501), AI Control Module (1502), Humanoid Movement/End-Effector Control Module (1503), and Robotic Actuation Module (1504).

AI-driven control loops dynamically adjust grip strength and movement trajectories, replicating expert manual dexterity in vehicle (107) surface treatments, including advanced film separation techniques such as knifeless tape simulation (FIG. 13) through controlled, non-damaging material scoring or tearing.

Real-Time 3D Surface Mapping:

The software (1502) integrates stereo cameras combined with laser grid projection to generate high-resolution, real-time 3D surface maps of treated vehicles (107). These precise surface reconstructions enable the AI Control Unit (1502) to plan accurate robotic tool paths and dynamically detect surface defects (601) during treatment.

Advanced AI Models for Learning and Adaptation:

The AI Control Unit (1502) incorporates multiple machine learning architectures to enable continuous learning, real-time adaptation, and autonomous process improvement, including:

End-to-End Neural Networks: Map multi-sensory inputs (vision (101), force (1501), temperature (1501)) directly to robotic control outputs, facilitating adaptive handling of complex tasks.

Imitation Learning: Leverages expert human wrapping and coating demonstration videos to command robots (105) with human-level dexterity.

Deep Reinforcement Learning: Optimizes control policies via simulations, minimizing defects (601) and material waste.

Vision-Language-Action Models: Translate natural language instructions combined with visual data into complex robotic action sequences for novel tasks.

Adaptive Learning: Continuously analyzes operational data aggregated through cloud connectivity to improve fleet-wide software performance.

Training data sources include:

Real-world expert demonstrations captured via motion tracking of skilled technicians.

Synthetic data from physics-based simulations.

Iterative reinforcement learning within virtual environments to optimize squeegee motion and tool handling under varying surface conditions.

Parametric control algorithms simulate squeegee motions by adjusting amplitude, frequency, and angle in real time based on sensor feedback (1501), including pressure sensors and optical adhesion monitors, ensuring optimal film tension and adhesion quality.

Workflow for Contoured Vehicle Areas (Bumpers, Mirrors, Door Handles):

Enhanced Surface Scanning: High-density 3D scans capture detailed geometry including recessed features and sharp curves.

Dynamic Film Cutting and Tension Mapping: AI (1502) adjusts film shape with relief cuts tailored for curves, optimizing tension distribution zones.

AI-Controlled Pre-Stretch and Anchoring: Vinyl tensioning tool applies controlled pre-stretching of the film (1401); strategic anchoring points minimize slippage during application.

Multi-Axis Wrap Execution: Continuous multi-axis robotic motions precisely conform film (1401) to complex surfaces; AI (1502) modulates joint torque, heat application, and vibration in real time to maintain quality.

Complex Corner and Recess Handling: Glove-like dexterity tools or heated spatula tools (704) tuck and seal film (1401) into intricate recesses (1402) using real-time torque and force feedback (1501).

Real-Time Stretch Correction: AI (1502) detects overstretching or whitening effects and applies corrective heat pulses and micro-vibrations to relax film tension.

Final Edge Locking and Inspection: Heat-activated rolling tools (706) bond film edges securely; a final high-resolution scan confirms a defect-free finish.

Mirror Wrapping Workflow Includes:

Specialized 3D scanning of side mirror curvatures.

Surface segmentation into micro-contour zones.

Dynamic multi-point tension map generation.

Pre-stretched film (1401) with relief notches precisely cut and applied.

AI-controlled multi-axis wrapping using glove-like tools with corrective feedback (1501).

Seamless final edge sealing and tucking.

For humanoid robots (501) (e.g., Tesla Optimus, Figure AI), dynamic balance and joint compensation algorithms enable precise wrapping in mobile environments.

System Support for Films and Coatings:

The system (1502) supports a broad spectrum of films and coatings including:

Polyurethane paint protection films (PPF).

PVC vinyl wraps in satin, matte, gloss, high gloss, and textured finishes.

Color-infused protective films.

Nanoceramic coatings.

A range of window tint films for commercial or residential buildings (e.g., solar control, security, privacy films from various manufacturers).

The AI Control Unit (1502) monitors live sensor data (1501) and references cloud-stored material profiles to dynamically adjust key parameters including tension, temperature, pressure, motion profiles, and coating dispensing rates. This enables autonomous adaptation to new or varying materials and surface types without manual recalibration.

Automated Window Tint Film Installation Workflow

Robotic Workspace & Surface Preparation:

Environmental parameters validated, including ambient temperature (65-75° F.), lighting, humidity, and airflow.

Cleaning process involves robotic misting with 70% isopropyl alcohol followed by microfiber wiping with optimized coverage and pressure.

Robotic plastic razor blade tool head removes stubborn debris.

Visual systems (101) confirm surface cleanliness of vehicle (107) or building windows.

Robotic manipulators (1206) wear lint-free gloves to prevent contamination.

Autonomous Film Handling & Preparation:

Inspection for dust or defects (601) using high-resolution vision systems (101).

Film liners remain intact until application.

For pre-cut films (1401), AI (1502) verifies dimensions against a 3D window model.

For manually cut films (1401), AI (1502) commands cutting tool (705) to cut approximately ½ inch oversized, ensuring blade cleanliness and flat cutting surfaces.

Liner and adhesive side orientation recorded for accuracy.

Application Fluid & Tools Management:

Slip solution prepared by AI-controlled fluid dispenser mixing distilled water with 1-2 drops of baby shampoo per 16 oz.

Tools (110) checked for readiness: felt or rubber-edge squeegees, microfiber towels, heat guns or IR heaters, utility knives with fresh blades.

AI-Controlled Film Application:

Slip solution sprayed onto glass.

Liner peeled and adhesive side sprayed.

Film (1401) floated onto wet surface (vehicle (107) or building window).

AI (1502) guides sub-millimeter adjustments and applies light pressure to tack edges or centers, preventing stretching or bubbles (601).

Precision Squeegee & Air Removal Technique:

AI (1502) guides squeegee from center outward using optimized overlapping strokes at 10 o'clock and 2 o'clock angles.

Fluid levels monitored with respraying as needed.

Even, gentle pressure applied to prevent creases and bubbles (601).

Automated Curves & Complex Areas Management:

Controlled heat applied using heat guns or IR heaters.

AI (1502) softens film (1401) prior to shaping.

Gloves or soft squeegees used for precise forming.

Relief cuts are minimal and precisely executed.

Robotic Trimming & Edge Sealing:

Precision blades trim film (1401) flush with edges.

Sealing tools (706) apply heat and pressure for surface bonding.

Final squeegee pass ensures adhesion and moisture removal.

Treatment data logged, and finish quality confirmed.

Autonomous Final Inspection & Cure Management:

High-resolution scans detect defects (601) such as bubbles (601), creases, or lifted edges.

Small bubbles (601) logged and tracked for natural dissipation.

Larger bubbles (601) resolved using controlled micro-prick actions.

Curing instructions tailored to film type and climate.

Advisories provided: no window operation or cleaning for 2-7 days.

Data logging associates completion data with quality records.

Chemical Safety System (1502):

Restricts use of harsh or non-approved chemicals.

Only verified film-safe cleaning agents allowed.

Adhesive Integrity:

Robotic manipulators (1206) wear lint-free gloves to prevent contamination of adhesive film surfaces (1401) during handling.

Ventilation Control:

Onboard air quality sensors (1501) monitor and ensure proper ventilation during heat tool operation.

Relief Cut Module Overview:

AI-controlled relief cutting module (1502) replicates expert-level cutting techniques during vinyl application (1401) on complex geometries.

Surface Geometry Analysis:

High-resolution 3D scanning (101) combined with AI contour mapping (1502) detects sharp edges, compound curves, recessed features, and tight contours.

Relief Cut Location Determination:

Machine learning models (1502) trained on expert wrapping data calculate optimal cut positions, angles, and patterns.

Balances film stretch limits with surface complexity for conformal application.

Precision Cutting Mechanism:

Retractable-blade robotic cutting tool (705) performs sub-millimeter relief cuts directly on film (1401).

Zero risk of substrate contact and minimal film distortion.

Coordinated Film Manipulation:

AI (1502) executes relief cuts synchronized with robotic stretching, anchoring, heat application, and film (1401) alignment and tacking routines.

Real-Time Feedback and Adjustment:

Sensor suites (1501) monitor tension fluctuations, adhesion conditions, and material behavior.

AI (1502) dynamically adjusts cut depth, placement, and timing.

Integration with Multi-Step Wrapping:

Relief cutting seamlessly integrates with heat tool sequences, edge-tucking tool heads (704), and final visual inspection routines.

Data Logging and Learning:

Each relief cut is logged with film type, surface location, and application parameters.

This data refines cut precision, learning algorithms (1502), and AI-based cutting strategies.

Specialized Relief Cuts for Complex Surfaces:

Custom cut patterns accommodate side mirrors, door handles (1403), wheel arches, spoilers, and deep recesses.

Safety Protocols and Surface Protection:

AI-controlled safety features (1502) include blade auto-retraction, surface proximity alarms, and collision avoidance during cuts.

User Interface and Override Controls:

Human operators may review cut plans via tablet or augmented reality (AR) interfaces, override individual relief cut commands, and customize patterns for specific film types or techniques.

Multi-Material Compatibility:

Parameters automatically adjust based on material profiles including standard vinyl, PPF, color-shift films, and carbon or textured finishes.

Environmental Adaptation:

Cutting strategy adapts according to ambient temperature, humidity, and film flexibility or memory retention.

Quality Assurance and Final Inspection:

Vision systems (101) perform close-up scans of relief cut areas to detect lifting, edge curling, or adhesion failures (601). The AI (1502) automatically triggers correction routines or technician alerts.

Continuous Machine Learning Improvement:

The system (1502) logs outcomes of each cut, operator edits, and final inspection data, using feedback to enhance future cut path predictions, defect mitigation, and robotic motor control calibration.

Case Study: Side Mirror Wrapping:

The system (1502) demonstrates micro-relief cuts, heat-assisted shaping, and multi-axis robotic folding to achieve clean, durable wraps on highly contoured mirror housings.

Integration with Robotic Heating & Stretching Tools:

Relief cut timing is synchronized with stretch-force actuators and variable heat tools, enabling precise tension release under optimal temperature profiles.

Automated Documentation and Reporting:

A cloud-based system (1502) records cut counts and geometries, film material and vehicle model data (107), environmental conditions (1501), and timestamps, supporting internal quality benchmarking and client transparency.

Maintenance and Calibration Routines:

Robotic cutter (705) maintenance includes blade sharpness tests, self-cleaning sequences, and calibration alignment using fiducial scanning.

Scalability and Fleet Deployment:

The relief cut module (1502) deploys on fixed shop robots, mobile garage units, and fleet wrap service platforms (106), enabling synchronized operations across large installations.

Adaptive Cut Patterns for New Vehicle Models:

AutoWrap AI (1502) continuously downloads new vehicle surface data (107), learns from technician overrides, and updates its template library for emerging car models and wraps.

Collaboration with Human Experts:

Hybrid workflows support human demonstrations of custom cuts, which AI (1502) records and integrates into the global learning model.

Fail-Safe Emergency Stop Functions:

Supervisory interfaces (1500) provide immediate halt capabilities, safety protocols preventing damage or injury, and integrated diagnostic and recovery routines following interruptions.

Enhanced Edge Sealing Post Relief Cuts:

AI (1502) guides robotic folding and heat sealing after relief cuts to create seamless edges resistant to peeling and environmental damage.

Compatibility with Other Surface Treatments:

Relief cut workflows integrate with simultaneous or sequential coating, tinting, and protective film applications without interference.

User Training and Simulation Modules:

The AI (1502) offers simulated relief cut planning and execution environments, facilitating operator training and process optimization before live application.

Environmental and Waste Minimization:

Precision relief cuts reduce film waste and rework, contributing to sustainable material usage and cost efficiency.

Real-Time Adjustment for Field Applications:

In mobile deployments, relief cut plans adapt based on on-site lighting, temperature, and surface contamination detected by onboard sensors (1501).

Summary

The relief cut module (1502) is a cornerstone of the AutoWrap Robotics AI Control Unit (1502), enabling expert-level wrapping quality through precise, adaptive, and fully autonomous cutting strategies that replicate and surpass human capabilities.

Automated Ceramic Coating Workflow

Multi-Stage Ceramic Coating Process:

The AutoWrap Robotics AI Control Unit (1502) executes a comprehensive, multi-stage ceramic coating application process, replicating and enhancing expert human techniques through autonomous robotic action. This ensures optimal bonding, uniform coverage, and a defect-free finish by leveraging specialized tools and adaptive AI (1502).

Robotic Vehicle Washing and Drying:

After vehicle positioning (107), the AI (1502) commands a robotic cleaning tool head (701) equipped with soft brushes and high-pressure nozzles. It uses wax-free, gloss-free shampoo, controlling water pressure, brush force, and soap dispensing to remove contaminants without surface damage. This is followed by robotic drying via high-velocity air nozzles and microfiber drying attachments. AI (1502) confirms dryness using moisture sensors (1501) and optical verification (101).

Autonomous Decontamination with Clay:

A robotic clay mitt or bar tool (701) is lubricated and applied with calibrated pressure (≤1.2 Newtons). Force sensors (1501) and vibration feedback detect contamination levels and adjust passes accordingly. Post-clay, visual (101) and tactile inspections ensure a smooth, contaminant-free surface.

Robotic Polishing and Defect Correction:

AI (1502) selects polishing pads and compound based on 3D optical paint condition scans. A dual-action polisher applies compound in 2×2 ft sections at 2-4 Newtons pressure and 1800-3500 OPM rotation speed. Real-time monitoring assesses swirl removal, haze, and scratch reduction. Polishing stops when defect threshold drops below 0.3 microns.

AI-Controlled Final Wipe-Down (IPA Prep):

An applicator arm (105) sprays 70% isopropyl alcohol mist (10 ml/m$^2$) and wipes panels with microfiber attachments. AI (1502) confirms no residue remains through optical clarity scans (101) before coating.

Autonomous Ceramic Coating Application:

Robot (105) applies uniform ceramic coating beads (1-2 ml per 2×2 ft section), spreading with foam block applicators. Laser alignment (708) ensures overlapping coverage with less than 10% margin. Coating flashes for 3-5 minutes before the AI (1502) initiates leveling.

Robotic Buffing of Excess Residue:

A dedicated buffing tool (702) with microfiber pads removes high spots to enhance optical clarity. Buffing pressure (2.5-3 Newtons) and pass speed (~4 cm/s) are modulated dynamically based on surface reflectivity sensor data (1501). This ensures a uniform, defect-free finish without over-polishing.

Robotic Second Layer Application:

If specified, the AI (1502) repeats ceramic coating application and buffing after an optimal wait time of 30-60 minutes. Environmental sensors (1501) continuously monitor temperature, humidity, and airflow to maintain ideal curing conditions.

Monitored Cure Time:

The AI (1502) logs cure start times and advises on water avoidance (typically 48 hours) and total cure duration (5-7 days). Integrated ambient sensors (1501) provide real-time data to optimize curing quality.

AI-Enhanced Pre-Coating Checklist (Automated Verification):

The AI (1502) verifies the following before coating:

Vehicle (107) washed and dried.

Surface clay-bar treated and contaminant-free.

Polished finish with defects below threshold confirmed via high-resolution scans (101).

Panels wiped with IPA or detergent and residue-free.

Temperature and shading within ideal ranges (65-75° F./18-24° C.).

AI-Driven Buffing Optimization:

The AI (1502) dynamically adjusts buffing pressure and pass speed to prevent over-buffing and maintain surface integrity. Multi-spectral vision systems (101) detect residual haze or high spots (601), enabling real-time correction and ensuring a flawless finish. Buffing pad and microfiber towel condition are monitored and factored into parameter adjustments for consistent results.

Automated Vinyl Wrapping Workflow:

The AutoWrap Robotics AI Control Unit (1502) autonomously performs multi-stage vinyl film installation, leveraging expert techniques and adaptive control algorithms.

Expert Wrapping Techniques Execution:

Processes such as "glassing out," partial liner removal, and "10 & 2" squeegee motions are executed with precision to minimize bubbles (601) and creases.

Adaptive Surface Management:

The system (1502) employs real-time 3D deformable surface tracking and adaptive force control to manage vinyl stretching across complex vehicle contours (107).

Robotic Environment & Surface Preparation:

AI (1502) verifies ambient temperature (65-75° F./18-24° C.), airflow, and lighting for optimal workspace conditions. A robotic cleaning tool (701) applies 70% isopropyl alcohol mist and uses microfiber wipes to ensure a contaminant-free surface. Visual (101) and chemical sensors (1501) confirm wax, oil, and dust removal without damage. The system (1502) prevents use of harmful chemicals like gasoline or harsh solvents.

Autonomous Film Handling & Cutting Preparation:

Film (1401) is retrieved carefully from storage with liners intact to avoid contamination or creasing. Robotic manipulators (1206) handle film edges with dexterity. AI (1502) references 3D vehicle models (107) and templates to cut vinyl with a precision retractable blade (705), maintaining a 1-2 inch margin for trimming. Blade sharpness is continuously monitored and replaced as needed for clean, sharp cuts.

Application Fluid Control:

Slip solution prepared by AI-controlled fluid dispenser mixing distilled water with 1-2 drops of baby shampoo per 16 oz. Slip solution sprayed evenly on substrate and adhesive sides. AI (1502) controls spray volume and coverage to facilitate smooth sliding and repositioning without excessive moisture.

AI-Controlled Film Positioning and "Glassing Out":

Partial liner removal exposes adhesive while floating film (1401) above the vehicle panel (107). AI (1502) applies gentle tension and compliance control for wrinkle-free film alignment on complex surfaces. Film center or leading edge is lightly tacked for provisional placement. Controlled heat (120-150° F.) is applied on curves and recesses with real-time deformation monitoring (1501) to avoid overstretching.

Precision Squeegee Technique—AI-Optimized "10 & 2" Method:

From center tack point, the AI (1502) guides a vibration-assisted felt-edge squeegee outward at precise 10 o'clock or 2 o'clock angles, replicating an expert "windshield wiper" stroke pattern. This ensures even pressure distribution, long diagonal strokes, and exact overlap to efficiently remove trapped air pockets and glue lines. Exclusively uses felt-edge squeegees to prevent scratching. Continuously monitors squeegee angle, contact force, and pressure to optimize adhesion quality (FIG. 7).

Automated Curves, Edges & Seams Management:

Applies controlled heat (<140° F./60° C.) and stretches vinyl (1401) with contour-adaptive dexterity tools (1206) for seamless wrapping of curves, corners, and recesses (1402). Plans precise "butt seams" with sub-millimeter (<1 mm) gaps to avoid visible overlaps and maintain aesthetic integrity. Activates adhesive through post-application heat treatment to ensure strong bonding. Performs edge sealing using pressure rollers (706) or dexterous end-effectors (202) while vinyl (1401) remains pliable for maximum adhesion.

Robotic Trimming:

Uses a precision retractable cutting tool (705) to trim vinyl (1401) along AI-detected panel edges and seam lines. Employs a fresh cutting blade every 3-4 linear feet to maintain clean, sharp cuts without ragged edges. AI (1502) maintains consistent film tension during trimming to preserve vinyl shape and adhesive bond integrity.

Autonomous Final Inspection & Cure Time Management:

Conducts a high-resolution visual scan (101) to detect creases, micro-bubbles (601), glue lines, and other minor defects (601). Autonomously corrects minor imperfections, including micro-bubble venting through controlled, precision pin-pricking. Provides comprehensive curing instructions recommending avoidance of water, rain, and direct sunlight for 24-48 hours, ideally storing the vehicle in shade or climate-controlled conditions. Logs all curing and inspection data to a cloud database for quality assurance, traceability, and continuous process improvement.

Human-To-Robot Wrapping Training Module:

The AutoWrap AI Control System (1502) incorporates a human demonstration learning module that enables wrapping professionals to train the robotic system (105) through supervised sessions. Certified trainers from recognized programs (e.g., 3M, Avery Dennison) conduct 2-3 day training periods where the robot (105) captures human motion data including tool angles, motion paths, pressure dynamics, relief cut placements, and panel stretching techniques. Using reinforcement learning and motion imitation frameworks, the robot (105) builds a motion library to refine and generalize wrapping skills across various vehicle types (107) and materials (1401).

Hybrid Protective Wrap Film Application:

In addition to standard vinyl (1401) and paint protection films (PPF), the system (1502) supports hybrid protective films combining stretchability and durability. The AI (1502) dynamically adjusts heat application, squeegee motion, tension, and pressure based on the hybrid film's stretch profile and adhesion rates. Sensor feedback (1501) ensures conformal contact and seamless finishes, while curing protocols are tailored to the film's thickness and chemical composition.

Additional Safety & Best Practices for PPF Handling:

The AI (1502) ensures all materials (1401) and chemicals used are compatible and safe for PPF and vinyl surfaces, avoiding harsh degreasers or contaminants. Robotic manipulators (1206) automatically change lint-free gloves between stages to prevent contamination. Environmental sensors (1501) monitor air quality and ventilation during heat tool operation to protect film quality and operator safety.

Non-Dismantling Component Wrapping and Custom Template Generation:

The AutoWrap Robotics AI Control System (1502) introduces a novel capability to apply vehicle surface treatments around intricate components (1402) such as cameras, door handles, emblems on vehicles (107), or window frame components on building surfaces, without requiring prior dismantling. This innovation significantly reduces installation time, labor costs, and the risk of damage or lost parts associated with traditional methods. The process leverages the fine motor control and dexterity of humanoid robots (501), coupled with high-precision AI-driven mapping and manipulation.

Automated Door Jamb Wrapping Process:

This advanced capability for wrapping highly intricate and confined areas without disassembly is further demonstrated by the Automated Door Jamb Wrapping process. Controlled by the AI Control Unit (1502), the humanoid robot (501) precisely applies and tucks vinyl film (1401) into complex door jamb geometries (1402), including inner door panels, sills, and B/C-pillars, without manual removal of these components. The AI's (1502) detailed contour mapping and dynamic control of the robot's (1201) multi-jointed fingers (1301) and specialized tools (1403) ensure complete adhesion and a seamless, defect-free finish even around weather stripping, hinge mechanisms, and tight clearances. This represents a significant breakthrough in efficiency and quality for these conventionally labor-intensive areas.

Direct 3D Vehicle Scanning and AI-Driven Contour Inference:

The core of this capability is an integrated 3D vision system (101) that performs a detailed scan of the vehicle's (107) exterior, capturing the precise three-dimensional geometry of existing components (1402) such as door handles and cameras. This includes highly intricate and recessed areas like door jambs (1402), sills, and pillar interiors, which conventionally require labor-intensive disassembly for wrapping. The AI Control Unit (1502) processes this raw 3D scan data using advanced computer vision and deep learning algorithms to automatically identify component boundaries, complex contours, and exact junction points with surrounding vehicle panels (107). This enables autonomous inference of precise cut lines and template shapes, ensuring the treatment film (1401) perfectly wraps around components (1402) with flawless tucking beneath objects. To handle extremely intricate geometries or improve initial adherence, the robotic platform (105) may optionally apply a temporary, highly conformable material-such as precision masking tape or a sacrificial thin vinyl film-around the component (1402). This provides tactile feedback (1501) and a localized anchor for real-time AI adjustments.

Automated Custom Graphic and Decal Application Workflow:

The AutoWrap Robotics AI Control Unit (1502) autonomously performs high-precision application of custom graphics and decals suitable for branding, fleet customization, or individual personalization. Leveraging advanced 3D mapping, material (1401) handling, and dexterous manipulation, the system (1502) ensures accurate placement with a bubble-free finish.

Graphic Preparation and Cutting:

The system (1502) receives digital graphic files (vector or raster) and generates precise cutting paths. For vinyl decals (1401), a precision retractable cutting tool (705) cuts the material from a roll. For printed graphics, alignment with pre-printed material is ensured. The AI (1502) dynamically compensates for material shrinkage or expansion due to temperature.

Surface Preparation for Decals:

The robotic cleaning tool (701) thoroughly prepares the surface (107), including degreasing and wiping with solutions like 70% isopropyl alcohol. Visual sensors (101) confirm the surface is clean and contaminant-free.

Autonomous Decal Handling and Alignment:

Robotic manipulators (1206) retrieve decals (1401), and the AI (1502) uses high-resolution 3D vision (101) to align decals (1401) to target locations (e.g., door panel (107), hood (107), window) accounting for contours, body lines (1402), and registration marks, achieving sub-millimeter accuracy.

Application and Smoothing:

The robotic arm (105) applies decals (1401) with a specialized squeegee, controlling pressure and angle to remove trapped air bubbles (601). For large graphics, a wet application method with slip solution is autonomously controlled.

Contouring and Edge Finishing:

The humanoid robot's (501) dexterous hands (1206) conform decals (1401) over curves, rivets, or recesses (1402) using heated or glove-like dexterity tools. Post-heating ensures durability and memory retention.

Final Quality Assurance:

After application, a high-resolution scan (101) detects any bubbles (601), wrinkles (601), misalignment (601), or lifted edges (601). The AI (1502) initiates corrective actions such as micro-pricking or re-squeegeeing. All data including graphic file, vehicle ID (107), and quality metrics are logged to the cloud for traceability and continuous improvement.

Automated Door Jamb Wrapping (Non-Disassembly Method) for Humanoid Robots:

This embodiment applies to door jambs (1402) and adjacent interior surfaces using advanced dexterity of humanoid robots (501) (e.g., Tesla Optimus, Figure AI). The AI (1502) performs a high-resolution 3D scan of the open doorjamb area (1402), including inner door panels, sills, and B/C-pillars. It generates a custom film template and precise tool paths considering complex contours, weather stripping, hinges, and tight clearances—eliminating the need to remove doors or panels. Using glove-like dexterity and heated spatula tools (704), the robot (501) applies, stretches, and tucks custom-cut film (1401) into recesses (1402) with sub-millimeter precision. The AI (1502) dynamically controls pressure, heat, and tension using real-time force and tactile feedback (1501) to ensure complete adhesion and a seamless, defect-free finish without stressing vehicle components (1402). This dramatically reduces installation time, labor, and damage risk.

Autonomous Digital Template Generation and Precision Cutting:

Using AI inference (1502) from the 3D scan (101), optionally augmented by temporary material data, the AI Control Unit (1502) generates a highly accurate custom digital template defining "negative space" and exact cut lines for the film (1401) to fit perfectly around components (1402). Material stretch properties and application tolerances are dynamically accounted for. The AI (1502) commands a precision retractable cutting tool (705) to cut vinyl (1401) or PPF from a roll with sub-millimeter accuracy, matching the template.

Autonomous Application and Edge Sealing:

The humanoid robot (501), equipped with glove-like dexterity tools and embedded force/tactile sensors (1501), applies the custom-cut film (1401) autonomously. The AI (1502) controls multi-jointed fingers (1301), pressure, tension, and tool angles, mimicking expert hand motions to stretch, conform, and smooth film (1401) precisely around edges and recesses (1402). Localized heat from a controllable heat gun ensures film (1401) pliability and optimal adhesion without damage. This results in a seamless, bubble-free, securely adhered finish, eliminating the need for component removal and reinstallation.

Advantages Over Prior Art:

The AutoWrap Robotics system (1502), via innovative AI-driven control, adaptive methods, and flexible robotic integration (including humanoid robots (501)), offers transformative benefits:

Accelerated Throughput and Efficiency:

Capable of autonomously wrapping/coating 2-3 vehicles (107) daily versus 5-7+ days manually. Gains stem from AI-optimized tool path planning, seamless tool switching, and extended continuous operation, including multi-robot coordination. Supports complex multi-part decal application for large fleets (107), drastically reducing turnaround times.

Superior Quality and Reduced Error Rates:

Dramatically lowers defects (601) (bubbles, wrinkles, misalignment) with real-time AI monitoring (1502)

and autonomous corrections. Continuous learning ensures finishes surpass human consistency.

Enhanced Customization and Flexibility:

Supports diverse colors, branding, and finishes with precise application regardless of complexity. Enables flawless custom decals and graphic overlays. AI-driven adaptability (1502) facilitates quick changeovers between vehicle models (107) and treatments.

Scalable and Diverse Deployment:

Operates on fixed-base (106), gantry, and mobile humanoid robots (501) (Tesla Optimus, Figure AI), suitable for large service centers, fleet yards, and on-demand mobile services.

Cost Reduction and Operational Autonomy:

Significantly reduces labor, training, and management costs. Autonomous operation up to 16+ hours daily lowers oversight needs and operating expenses.

Enables New Business Models:

Supports franchising, AI software licensing, and SaaS subscription models for ongoing updates.

Non-Permanent, Customizable Treatments:

Offers removable films/coatings as superior alternatives to permanent paint modifications, providing flexibility and protection.

Flexible Deployment Beyond Factory Constraints:

Unlike factory gantry systems, humanoid robots (501) perform treatments with hand tools (110) in garages, fleet yards, and service vans, enabling real-world mobile autonomous operation.

Commercialization & Market Strategy:

Transformative Scalable Solution:

Addresses inefficiencies and quality inconsistency of manual/semi-automated processes with advanced AI software (1502) and modular robotic platforms (105).

High-Precision Automation:

Delivers accurate application of PPF, vinyl wraps, ceramic coatings, window tint films, and graphics with reduced defects (601) for superior finish quality.

Enhanced Throughput and Efficiency:

Processes multiple vehicles (107) daily, improving capacity and turnaround times.

Flexible Deployment Models:

Supports fixed installations and mobile/remote services via diverse robotic platforms (105) including humanoid robots (501), expanding reach and accessibility.

Material and Environmental Adaptability:

Dynamically adjusts parameters for different vehicle models (107), materials (1401), and environmental conditions (1501), maintaining consistent quality.

Data-Driven Continuous Improvement:

Uses cloud analytics and machine learning (1502) to refine processes, reduce waste, and optimize performance fleet-wide.

Commercialization Strategy: Exclusive Licensing:

Offering proprietary AI control software (1502) and specialized robotic tool heads (701-708) under exclusive licenses to key industry partners.

Strategic Partnerships:

Collaborations with vehicle manufacturers (107), dealerships, fleet operators, and automotive service providers to integrate the system (1502) into existing workflows and expand market penetration. Includes dedicated solutions for fleet branding and custom graphic installations.

Strategic Objective:

Through this multifaceted approach, AutoWrap Robotics aims to redefine vehicle surface treatment automation by delivering substantial improvements in quality, efficiency, scalability, and environmental impact—positioning itself as a leader in next-generation automotive finishing technologies.

Enablement and Best Mode Disclosure

System Overview:

The AutoWrap Robotics system (1502) comprises:

General-purpose third-party robots (105) compatible with the system (1502) (e.g., Tesla Optimus, Figure AI robot (501), Boston Dynamics Atlas) (FIG. 5).

Tool magazine (400) capable of holding and switching between at least ten (10) specialized tool heads (701-708) (FIG. 4).

AI software stack (1502) capable of autonomous vehicle surface treatment, control, and optimization.

Sensor suite (1501) including stereo vision (101), LiDAR, environmental sensors, and embedded haptic feedback for closed-loop precision control.

Software Framework

Middleware: A robotics middleware framework manages communications among control nodes, sensors (1501), and actuators.

Programming Languages: Standard programming languages are utilized for control logic, image processing, and sensor data integration.

Vision & Scanning: Standard vision and point cloud libraries are used for real-time 3D surface scanning (101), segmentation, and mapping.

AI & Machine Learning: An AI framework is used for training and deploying all core machine learning models (1502). This includes models for vision feedback (101), motion planning, imitation learning, and deep reinforcement learning. Model architectures, data sources (including 500+ hours of expert human demonstration data), and training methodologies are detailed herein.

Motion Control for Humanoid Robots

Inverse Kinematics (IK): Libraries compatible with the robotics middleware generate motion sequences for wrapping and detailing tasks.

Human Techniques Capture: Human techniques (e.g., PPF or ceramic coating application) captured via motion capture systems (e.g., optical or depth sensor-based systems). These captured techniques are translated via imitation learning methods such as Behavior Cloning or Dataset Aggregation (DAgger) (FIG. 7). The resultant trained policies are then refined using deep reinforcement learning within a simulated environment to optimize for factors like adhesion quality, speed, and defect minimization.

Captured motion data is converted into robotic joint commands and stored as modular skill routines.

Tool Head Integration

Tool heads (701-708) mounted via magnetic coupling with electrical interface pins, motorized bayonet mounts, or robotic quick-change adapters (e.g., commercial adapters).

Each tool head (701-708) includes a unique ID chip (RFID or QR code), built-in temperature, pressure, and force sensors (1501), and AI-calibrated operation profiles stored locally or in the cloud for specific tasks (e.g., squeegeeing, buffing, cutting).

Overlap and Seam Management

AI (1502) identifies edge boundaries using 3D vision (101) and mapped contours.

Executes angled cuts (30-45°) with retractable precision blades (705).

Applies heated spatulas (704) or robotic fingers (1206) to fold film (1401) with downward force (5-15 Newtons) and controlled heat (90-130° C.).

Utilizes AI-generated pressure and thermal maps to reduce edge lift, overstretching, or misalignment (601).

Cloud-Based Learning and Deployment

Figure 8:
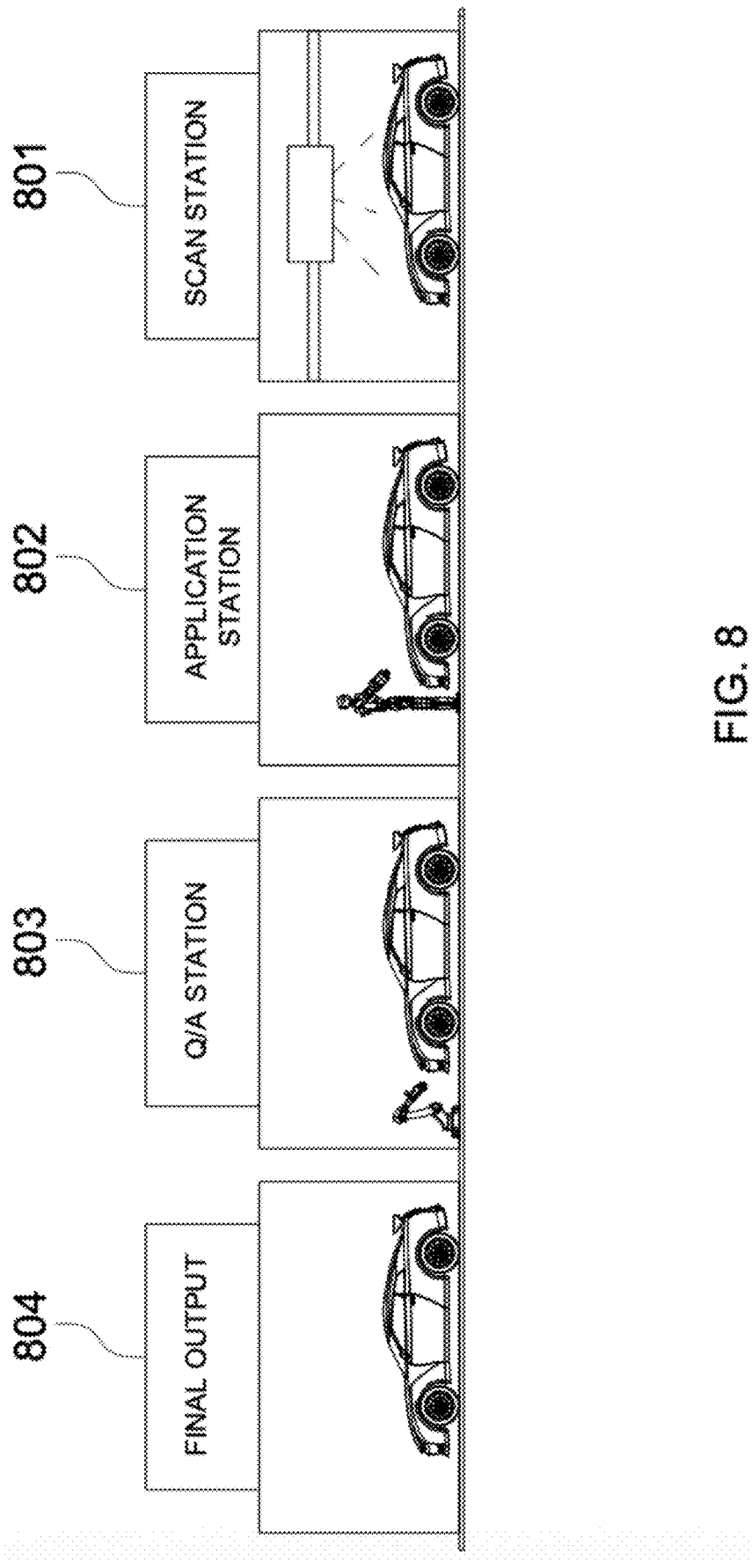
FIG. 8 is a station-level layout showing the Scan Station (801), Application Station (802), Quality Assurance (803), and Final Output (804) stages of the wrap process.

Connects securely to cloud control and analytics platforms via standard communication protocols (e.g., MQTT or REST APIs). Supports remote task sequence updates and downloadable workflow templates. Fleet-wide over-the-air (OTA) updates for continuous performance improvement (FIG. 8).

Best Mode Contemplated

Hardware: Compatible third-party robot platforms (105) such as Tesla Optimus or Figure AI robot (501).

Middleware: A compatible robotics middleware framework.

Machine Learning: Machine learning models (1502) trained on over 500 hours of expert human demonstration data.

Processing: The trained models (1502) are optimized and deployed for real-time edge inference on a high-performance edge computing platform. This platform's dedicated processing capabilities enable low-latency processing of sensor fusion data (LiDAR, stereo vision (101), tactile/force sensors (1501)) at high frame rates (e.g., exceeding 60-120 frames per second). This rapid inference is critical for dynamic adjustments to squeegee pressure, heat gun parameters, and vinyl tension, allowing for instantaneous defect detection (601) and correction (e.g., autonomous micro-pricking or re-squeegeeing) within single-digit milliseconds. This ensures a continuous and high-quality application workflow directly at the robot's location without reliance on constant cloud-based processing for core operational decisions.

Deployment: Mobile, garage-based robot (105) equipped with tool-switching capability and real-world wrapping tools (FIG. 5).

Data Privacy and Cybersecurity

The system (1502) implements enterprise-grade security measures including:

TLS 1.3 encrypted communications.

Secure MQTT and RESTful API authentication.

Role-based access control (RBAC) and multi-factor authentication (MFA).

Cryptographically signed firmware and OTA updates.

Cloud data storage compliant with ISO/SAE 21434 automotive cybersecurity standards.

Summary of Enablement

The disclosed system architecture (1502), toolchain, and AI methodologies (1502) enable a skilled engineer in robotics or automation to replicate and deploy the AutoWrap Robotics system (1502) without undue experimentation. Such an engineer would be able to:

Procure or configure a compatible humanoid robot (501).

Mount and integrate appropriate sensors (1501) and tool heads (701-708).

Install the AI software stack (1502) using disclosed frameworks and toolkits.

Initiate autonomous surface treatment workflows for vinyl wrapping, ceramic coating, PPF, or tinting with adaptive quality control.

Connect to cloud-based systems (1502) for updates, training data, and analytics.

The invention claimed is:

1. A computer-implemented artificial intelligence (AI) control system for autonomous surface treatment and film application, comprising:

a software platform executing machine learning algorithms configured to autonomously control surface treatment operations on a target surface, the target surface being an exterior surface of a vehicle or watercraft, or an interior or exterior window surface of a commercial or residential building;

an interface module configured to communicate with one or more robotic platforms selected from the group consisting of:

(a) humanoid robots featuring bipedal or non-wheeled locomotion and dexterous robotic hands capable of manipulating surface treatment tools;

(b) articulated robotic arms; and (c) mobile robotic units capable of autonomous navigation;

a three-dimensional vision system comprising stereo cameras and laser grid projectors configured to scan the target surface and generate high-resolution digital surface models;

an automated tool magazine operatively connected to the robotic platform and holding a plurality of interchangeable tool heads, each tool head is controlled by the artificial intelligence system and is configured to perform at least one surface treatment task selected from paint protection film application, vinyl wrapping, ceramic coating, window tint application, custom graphic application, decal application;

wherein the plurality of interchangeable tool heads include:

a heat-controlled roller tool head for vinyl wrap application; a rotating mist sprayer and microfiber buffing tool;

a paint protection film applicator tool with heat and pressure sensors;

a heated flexible spatula tool; (v) a precision retractable cutting tool;

a motorized film tensioning tool configured to stretch and maintain vinyl film tension for wrinkle-free application;

a vibration-assisted squeegee tool configured to simulate controlled hand-angle motion simulating 10 o'clock and 2 o'clock hand angle vibration-assisted squeegee technique;

a knifeless tape configured to perform precise nondestructive film trimming without physical blades or adhesive-backed cutting filaments, and capable of being manipulated by dexterous robotic hands while performing automated controlled trim operation;

controllable heat gun end effectors; and a glove-like dexterity tool comprising multi-jointed fingers with tactile feedback sensors;

wherein the AI control system autonomously interprets the digital surface models, selects tool heads, controls robotic motion including dexterous manipulation by robotic hands, execute multi-step surface treatment operations, detects defects, and performs real-time corrective actions without requiring human intervention; and wherein the AI control system is operable in fixed workspace and remote mobile deployments without requiring ownership, modification, or customization of proprietary robotic hardware.

2. The AI control system of claim 1, wherein the robotic platform comprises a humanoid robot configured for autonomous mobility and dexterous manipulation using multi-jointed robotic hands.

3. The AI control system of claim 1, wherein the robotic platform is: (a) equipped with an automated tool magazine configured for mid-process tool switching among the plurality of interchangeable tool heads; or (b) equipped with dexterous robotic hands comprising multi-jointed fingers with embedded force and tactile sensors, configured to manipulate surface treatment tools or robotic tool heads using AI-driven control algorithms.

4. The AI control system of claim 3, further predicts and selects tool heads based on surface conditions and surface treatment progress to minimize operational downtime.

5. The AI control system of claim 1, further comprising integrated sensors configured to detect bubbles, wrinkles, coating imperfections, and environmental conditions, wherein the AI control system dynamically adjusts application parameters based on sensor feedback.

6. The AI control system of claim 5, wherein environmental sensors and AI algorithms adapt treatment parameters in response to ambient temperature, humidity, wind, and surface contamination levels.

7. The AI control system of claim 1, is further configured to record operational parameters, analyze detected defects, and update control algorithms in a centralized database to enable fleet-wide learning and optimization.

8. The AI control system of claim 1, wherein the robotic platform is a mobile unit equipped with onboard tool storage, automated tool changing, wireless connectivity and autonomous navigation.

9. The AI control system of claim 8, further maps human expert demonstration motions onto articulated robotic joints using imitation learning or motion capture data to execute surface treatment operations.

10. The AI control system of claim 1, further executes an automated surface treatment routine for vehicle mirror assemblies using 3D scans, micro-contour segmentation, adaptive film stretching, and corrective heat and vibration application.

\* \* \* \* \*